(12) United States Patent
Umemoto et al.

(10) Patent No.: US 7,906,184 B2
(45) Date of Patent: Mar. 15, 2011

(54) OPTICAL FILM, METHOD OF PRODUCING THE SAME, AND IMAGE DISPLAY APPARATUS USING THE OPTICAL FILM

(75) Inventors: Seiji Umemoto, Osaka (JP); Ikuo Kawamoto, Osaka (JP); Kentarou Takeda, Osaka (JP)

(73) Assignee: Nitto Denko Corporatin, Ibaraki-shi, Osaka (JP)

( * ) Notice: Subject to any disclaimer, the term of this patent is extended or adjusted under 35 U.S.C. 154(b) by 808 days.

(21) Appl. No.: 11/817,762

(22) PCT Filed: Jan. 30, 2006

(86) PCT No.: PCT/JP2006/301410
§ 371 (c)(1),
(2), (4) Date: Sep. 4, 2007

(87) PCT Pub. No.: WO2006/092917
PCT Pub. Date: Sep. 8, 2006

(65) Prior Publication Data
US 2009/0052028 A1      Feb. 26, 2009

(30) Foreign Application Priority Data

Mar. 2, 2005   (JP) ................................. 2005-057074
May 25, 2005   (JP) ................................. 2005-152309

(51) Int. Cl.
*G02F 1/13363*   (2006.01)
*G02B 1/08*   (2006.01)

(52) U.S. Cl. ........... 428/1.3; 428/1.31; 349/96; 349/117; 349/118

(58) Field of Classification Search .................... 428/1.3, 428/1.31; 349/117–121, 96
See application file for complete search history.

(56) References Cited

U.S. PATENT DOCUMENTS 5,550,661 A * 8/1996 Clark et al. .................... 349/117
6,281,952 B1   8/2001 Okamoto et al.
(Continued)

FOREIGN PATENT DOCUMENTS

JP            7253573 A    10/1995
(Continued)

OTHER PUBLICATIONS

International Search Report of PCT/JP2006/301410, date of mailing Apr. 25, 2006.

*Primary Examiner* — Sophie Hon
(74) *Attorney, Agent, or Firm* — Westerman, Hattori, Daniels & Adrian, LLP

(57) ABSTRACT

An object of the present invention is to provide an optical film capable of contributing to reduction in thickness, preventing uneven heating, and favorably preventing light leak in black display, and an image display apparatus using such an optical film. An optical film of the present invention includes a polarizer, a first optical compensation layer having a refractive index profile of nx>ny=nz, and a second optical compensation layer having a refractive index profile of nx>ny>nz in the stated order. In the optical film, an angle formed between an absorption axis of the polarizer and a slow axis of the first optical compensation layer is +17° to +27° or −17° to −27°, an angle formed between the absorption axis of the polarizer and a slow axis of the second optical compensation layer is +85° to +95°, and an Nz coefficient of the second optical compensation layer is $1.2 \leq Nz \leq 2$.

12 Claims, 8 Drawing Sheets

U.S. PATENT DOCUMENTS

| | | |
|---|---|---|
| 6,593,982 B2 | 7/2003 | Yoon et al. |
| 6,762,811 B2 * | 7/2004 | Sasaki et al. ................ 349/118 |
| 7,110,073 B2 * | 9/2006 | Hsu et al. ...................... 349/119 |
| 7,462,381 B2 * | 12/2008 | Yoshimi et al. ................ 428/1.1 |
| 2001/0030726 A1 * | 10/2001 | Yoshida et al. ................ 349/117 |
| 2003/0067574 A1 | 4/2003 | Sasaki et al. |
| 2004/0227876 A1 | 11/2004 | Okumura |

FOREIGN PATENT DOCUMENTS

| | | |
|---|---|---|
| JP | 11242226 A | 9/1999 |
| JP | 2000190385 A | 7/2000 |
| JP | 2001209065 A | 8/2001 |
| JP | 2003114325 A | 4/2003 |
| JP | 2004272202 A | 9/2004 |
| JP | 2004279566 A | 10/2004 |

* cited by examiner

FIG. 6a
FIG. 6b
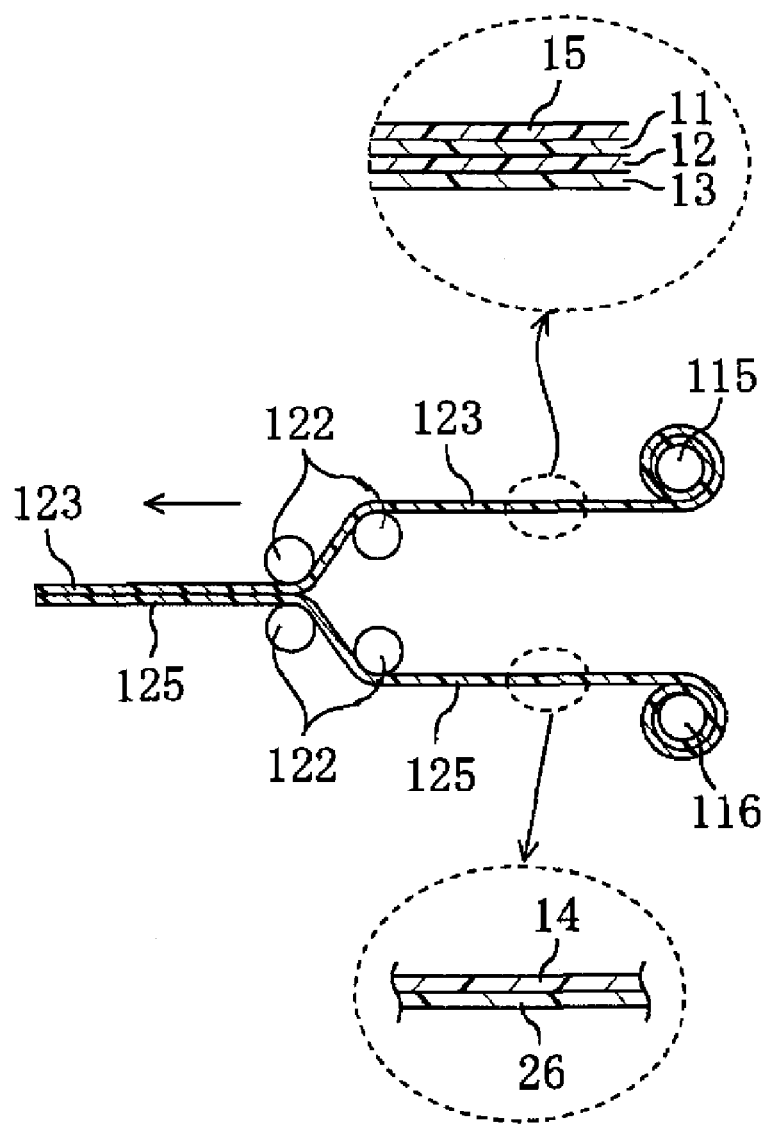
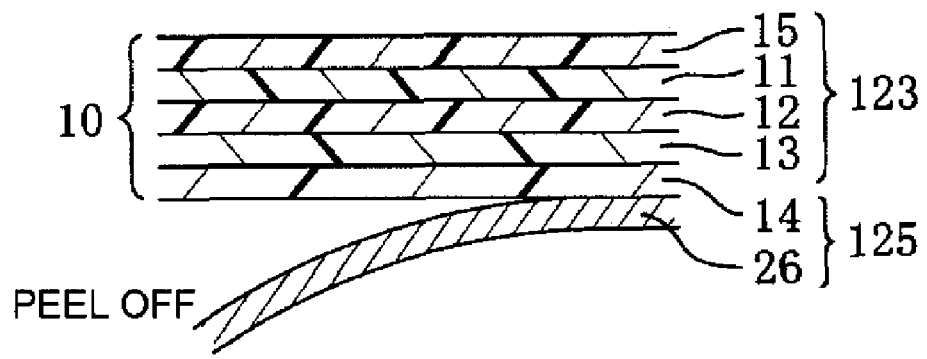

OPTICAL FILM, METHOD OF PRODUCING THE SAME, AND IMAGE DISPLAY APPARATUS USING THE OPTICAL FILM

This application is a 371 of PCT/JP2006/301410, filed Jan. 30, 2006.

TECHNICAL FIELD

The present invention relates to an optical film, a method of producing the same, and to an image display apparatus using the optical film. More specifically, the present invention relates to an optical film capable of contributing to reduction in thickness, preventing uneven heating, and favorably preventing light leak in black display, a simple and inexpensive method of producing the optical film, and to an image display apparatus using such an optical film.

BACKGROUND ART

There is proposed a semi-transmissive reflective liquid crystal display apparatus as a liquid crystal display apparatus of VA mode, in addition to a transmissive liquid crystal display apparatus and a reflective liquid crystal display apparatus (see JP 11-242226 A and JP 2001-209065 A, for example). The semi-transmissive reflective liquid crystal display apparatus utilizes outside light in the same manner as in the reflective liquid crystal display apparatus in a bright place, and allows visualization of display with an internal light source such as backlight in a dark place. That is, the semi-transmissive reflective liquid crystal display apparatus employs a display system combining reflective mode and transmissive mode, and switches display mode to reflective mode or transmissive mode in accordance with brightness of its environment. As a result, the semi-transmissive reflective liquid crystal display apparatus can provide a clear display even in a dark environment while reducing power consumption, and thus is suitably used for a display part of a portable device.

A specific example of such a semi-transmissive reflective liquid crystal display apparatus is a liquid crystal display apparatus including on an inner side of a lower substrate a reflective film which has a window part for light transmission formed on a metal film of aluminum or the like and which serves as a semi-transmissive reflecting plate. In a liquid crystal display apparatus of reflective mode, outside light entering from an upper substrate side passes through a liquid crystal layer, reflects on a reflective film on an inner side of the lower substrate, passes through the liquid crystal layer again, and exits from the upper substrate side, to thereby contribute in display. Meanwhile, in a liquid crystal display apparatus of transmissive mode, light from backlight entering from the lower substrate side passes through the window part of the reflective film and through the liquid crystal layer, and exits from the upper substrate side, to thereby contribute in display. Thus, of a reflective film-formed region, a region having the window part formed becomes a transmissive display region, and the remaining region becomes a reflective display region.

However, in a conventional reflective or semi-transmissive liquid crystal display apparatus of VA mode, problems of light leak in black display and reduction in contrast have not been solved for a long period of time.

DISCLOSURE OF THE INVENTION

Problems to be Solved by the Invention

The present invention has been made in view of solving conventional problems described above, and an object of the present invention is to provide an optical film capable of contributing to reduction in thickness, preventing uneven heating, and favorably preventing light leak in black display, a simple and inexpensive method of producing the optical film, and an image display apparatus using such an optical film.

Means for Solving the Problems

An optical film of the present invention includes a polarizer, a first optical compensation layer having a refractive index profile of nx>ny=nz, and a second optical compensation layer having a refractive index profile of nx>ny>nz in the stated order, in which:

an angle formed between an absorption axis of the polarizer and a slow axis of the first optical compensation layer is +17° to +27° or −17° to −27°;

an angle formed between the absorption axis of the polarizer and a slow axis of the second optical compensation layer is +85° to +95°; and an Nz coefficient of the second optical compensation layer is $1.2 \leq Nz \leq 2$.

In a preferred embodiment, the second optical compensation layer is formed of at least one polymer selected from the group consisting of polyimide, polyamide, polyetherketone, polyamideimide, and polyesterimide. In a preferred embodiment, the second optical compensation layer has a thickness of 1 μm to 10 μm. In a preferred embodiment, the second compensation layer includes a λ/4 plate.

In a preferred embodiment, the first optical compensation film includes at least one of a liquid crystal monomer and a liquid crystal polymer. In a preferred embodiment, the first optical compensation layer includes a λ/2 plate.

In a preferred embodiment, the optical film of the present invention includes an adhesive layer between the first optical compensation layer and the second optical compensation layer.

According to another aspect of the present invention, an image display apparatus is provided. The image display apparatus includes the optical film.

According to still another aspect of the present invention, a method of producing an optical film is provided. The method of producing an optical film includes the steps of:

subjecting a surface of a transparent protective film (T) to alignment treatment;

forming a first optical compensation layer on the surface of the transparent protective film (T) subjected to the alignment treatment;

laminating a polarizer on the surface of the transparent protective film (T); and forming a second optical compensation layer on a surface of the first optical compensation layer, in which:

the polarizer and the first optical compensation layer are arranged on opposite sides through the transparent protective film (T);

the first optical compensation layer is formed such that an angle formed between a slow axis of the first optical compensation layer and an absorption axis of the polarizer is +17° to +27° or −17° to −27°; and the second optical compensation layer is formed such that an angle formed between a slow axis of the second optical compensation layer and the absorption axis of the polarizer is +85° to +95°.

In a preferred embodiment, the step of forming the first optical compensation layer includes the steps of: applying an application liquid containing a liquid crystal material; and aligning the applied liquid crystal material through treatment at a temperature at which the liquid crystal material exhibits a liquid crystal phase.

In a more preferred embodiment, the above-mentioned liquid crystal material includes a polymerizable monomer and/or a crosslinking monomer and the step of aligning the liquid crystal material further includes conducting polymerization treatment and/or crosslinking treatment. In a more preferred embodiment, the polymerization treatment and/or the crosslinking treatment is conducted through heating or photoirradiation.

In a preferred embodiment, the second optical compensation layer is formed such that an Nz coefficient is $1.2 \leq Nz \leq 2$.

In a preferred embodiment, the step of forming a second optical compensation layer on a surface of the first optical compensation layer includes the steps of: applying on a surface of a substrate sheet an application liquid containing at least one polymer selected from the group consisting of polyimide, polyamide, polyetherketone, polyamideimide, and polyesterimide; forming a polymer layer on the surface of the substrate sheet by drying the application liquid; forming the second optical compensation layer on the substrate sheet by heating and stretching the polymer layer together with the substrate sheet; attaching the second optical compensation layer formed on the substrate sheet to the surface of the first optical compensation layer; and peeling off the substrate sheet from the second optical compensation layer.

In a more preferred embodiment, the polymer layer is stretched together with the substrate sheet at a stretch ratio of 1.2 times to 3 times in the step of forming the second optical compensation layer on the substrate sheet. In a more preferred embodiment, the polymer layer is stretched together with the substrate sheet in a width direction in the step of forming the second optical compensation layer on the substrate sheet.

Effects of the Invention

As described above, in a laminated optical film of the present invention, a first optical compensation layer (λ/2 plate) having a refractive index profile of nx>ny=nz and a second optical compensation layer (λ/4 plate) having a refractive index profile of nx>ny>nz are used in combination, and an angles formed between the absorption axis of the polarizer and a slow axes of the first optical compensation layer and the second optical compensation layer are set within predetermined ranges. Further, the Nz coefficient of the second optical compensation layer is preferably set within a predetermined range ($1.2 \leq Nz \leq 2$). Thus, light leak in black display may significantly be improved in a reflective or semi-transmissive liquid crystal display apparatus of VA mode, in particular. Further, according to the present invention, a viewing angle may significantly be improved in a wide wavelength range in a reflective or semi-transmissive liquid crystal display apparatus of VA mode, in particular. According to the present invention, a specific first optical compensation layer and a specific second optical compensation layer may be used to form a very thin first optical compensation layer and a very thin second optical compensation layer. Thus, the present invention is capable of greatly contributing to reduction in thickness of an image display apparatus and significantly preventing uneven heating.

BRIEF DESCRIPTION OF THE DRAWINGS

FIG. 6 Schematic diagrams showing a process outline according to still another example of the method of producing an optical film of the present invention.

Figure 1:
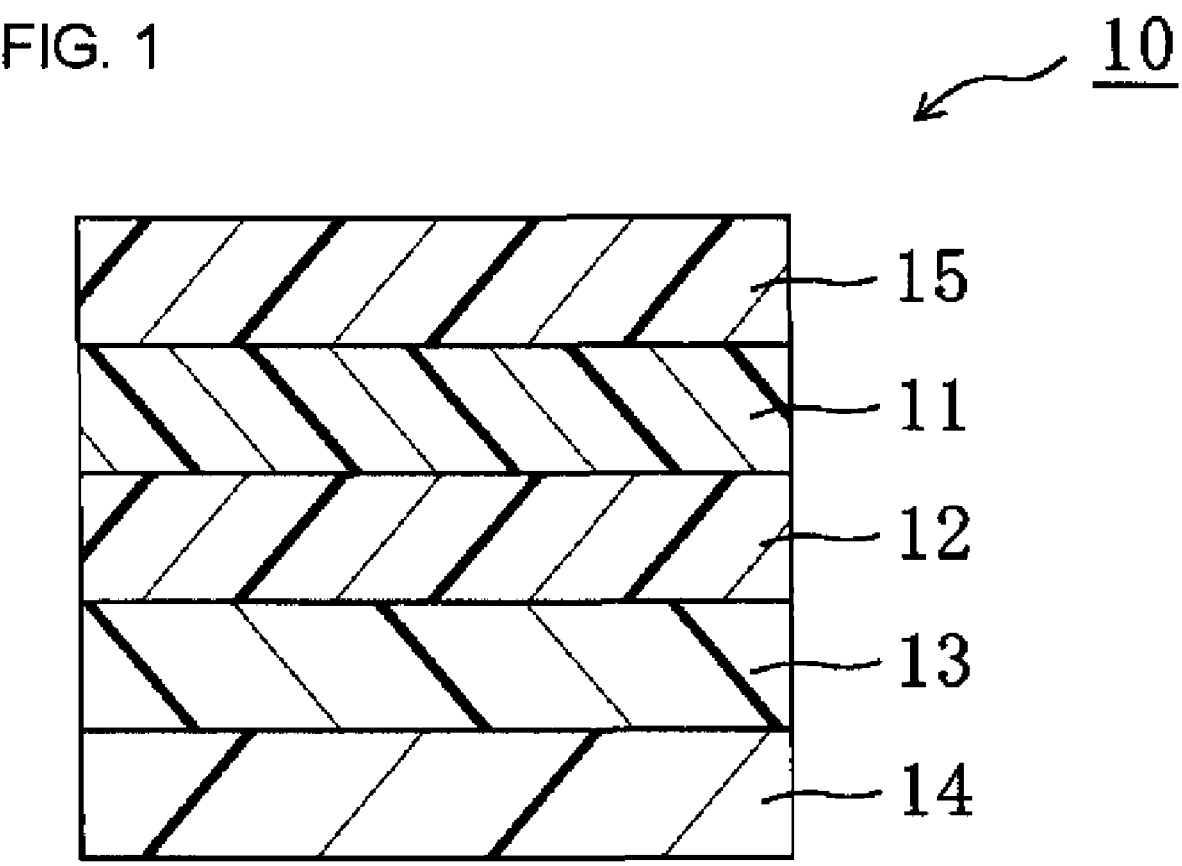
FIG. 1 A schematic sectional view of an optical film according to a preferred embodiment of the present invention.

DESCRIPTION OF SYMBOLS 10 optical film
11 polarizer
12 protective layer
13 first optical compensation layer
14 second optical compensation layer
15 second protective layer
20 liquid crystal cell
100 liquid crystal panel

BEST MODE FOR CARRYING OUT THE INVENTION

Definitions of Terms and Symbols

Definitions of terms and symbols in the specification of the present invention are described below.

(1) The symbol "nx" refers to a refractive index in a direction providing a maximum in-plane refractive index (that is, a slow axis direction), and the symbol "ny" refers to a refractive index in a direction perpendicular to the slow axis in the plane (that is, a fast axis direction). The symbol "nz" refers to a refractive index in a thickness direction. Further, the expression "nx=ny", for example, not only refers to a case where nx and ny are exactly equal but also includes a case where nx and ny are substantially equal. In the specification of the present invention, the phrase "substantially equal" includes a case where nx and ny differ within a range providing no effects on overall optical characteristics of an optical film in practical use.

(2) The term "in-plane retardation Re" refers to an in-plane retardation value of a film (layer) measured at 23° C. by using light of a wavelength of 590 nm. Re can be determined from an equation Re=(nx−ny)×d, where nx and ny represent refractive indices of a film (layer) at a wavelength of 590 nm in a slow axis direction and a fast axis direction, respectively, and d (nm) represents a thickness of the film (layer).

(3) The term "thickness direction retardation Rth" refers to a thickness direction retardation value measured at 23° C. by using light of a wavelength of 590 nm. Rth can be determined from an equation Rth=(nx−nz)×d, where nx and nz represent refractive indices of a film (layer) at a wavelength of 590 nm in a slow axis direction and a thickness direction, respectively, and d (nm) represents a thickness of the film (layer).

(4) An Nz coefficient refers to a ratio of in-plane retardation Re and thickness direction retardation Rth and An Nz coefficient is determined by an expression $Nz=(nx-nz)/(nx-ny)$.

(5) The subscript "1" attached to a term or symbol described in the specification of the present invention represents a first optical compensation layer. The subscript "2" attached to a term or symbol described in the specification of the present invention represents a second optical compensation layer.

(6) The term "λ/2 plate" refers to a plate having a function of converting linearly polarized light having a specific vibration direction into linearly polarized light having a vibration direction perpendicular thereto, or converting right-handed circularly polarized light into left-handed circularly polarized light (or converting left-handed circularly polarized light into right-handed circularly polarized light). The λ/2 plate has an in-plane retardation value of a film (layer) of about ½ of a light wavelength (generally, in a visible light region).

(7) The term "λ/4 plate" refers to a plate having a function of converting linearly polarized light of a specific wavelength into circularly polarized light (or converting circularly polarized light into linearly polarized light). The λ/4 plate has an in-plane retardation value of a film (layer) of about ¼ of a light wavelength (generally, in a visible light region).

A. Optical Film

A-1. Overall Structure of Optical Compensation Film

Figure 2:
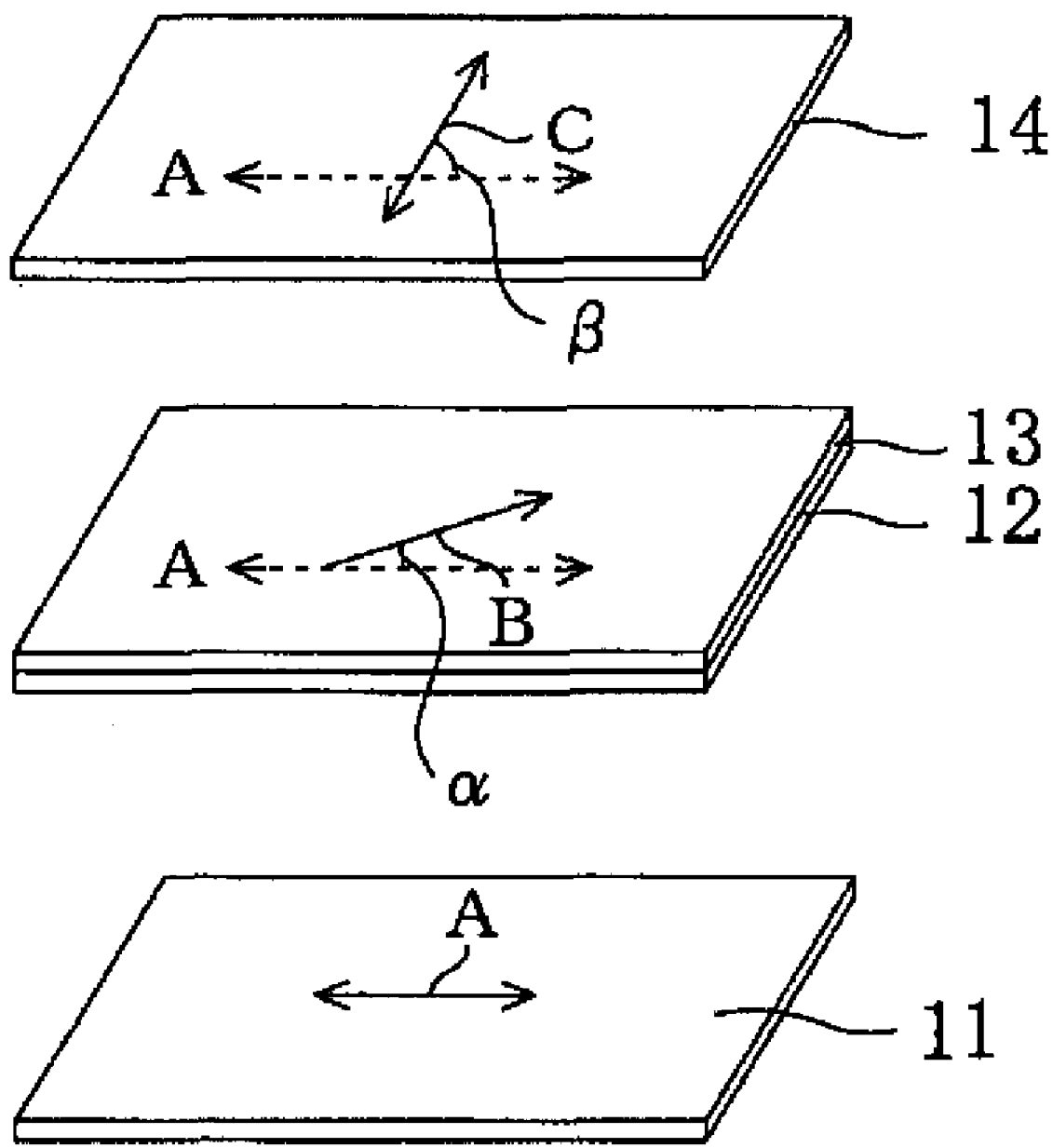
FIG. 2 An exploded perspective view of the optical film according to a preferred embodiment of the present invention.
Figure 3:
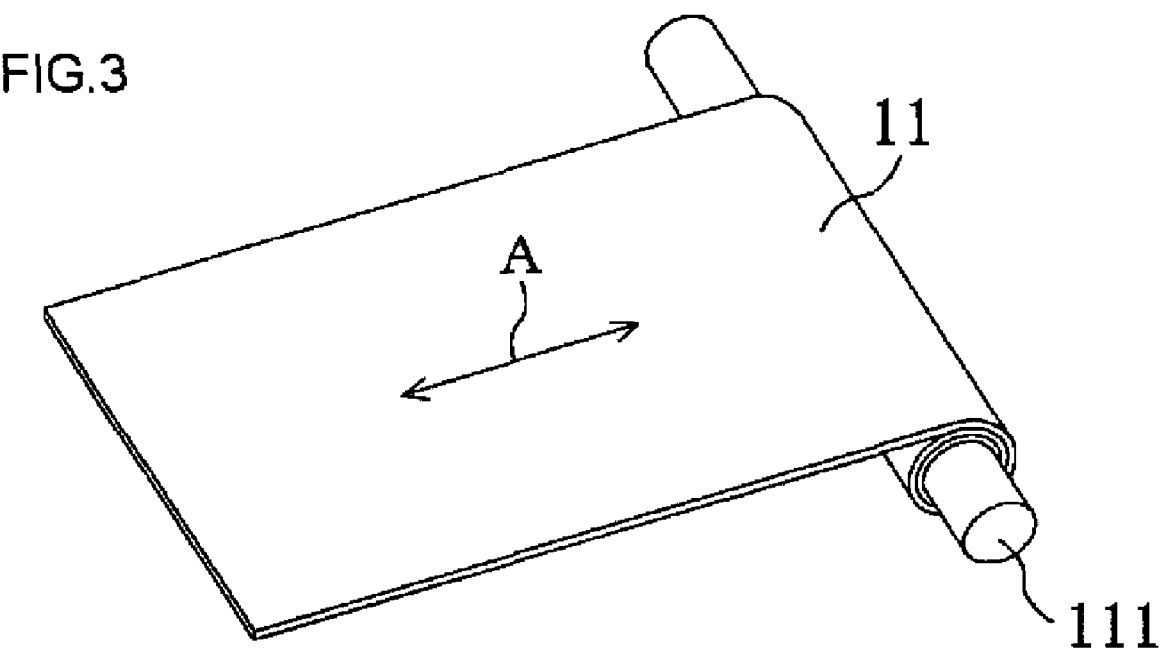
FIG. 3 A perspective view showing a process outline according to an example of a method of producing an optical film of the present invention.

FIG. 1 is a schematic sectional view of an optical film according to a preferred embodiment of the present invention. FIG. 2 is an exploded perspective view explaining optical axes of respective layers forming the optical film of FIG. 1. As shown in FIG. 1, an optical film 10 includes a polarizer 11, a first optical compensation layer 13, and a second optical compensation layer 14 in the stated order. The layers of the optical film are laminated through any appropriate pressure-sensitive adhesive layer or adhesive layer (not shown). For practical use, any appropriate protective film (transparent protective film) 15 may be laminated on the polarizer 11 on a side having no optical compensation layer formed. Further, as required, any appropriate protective film (transparent protective film) 12 may be provided between the polarizer 11 and the first optical compensation layer 13.

The first optical compensation layer 13 has a refractive index profile of nx>ny=nz. The second optical compensation layer 14 has a refractive index profile of nx>ny>nz and an Nz coefficient of $1.2 \leq Nz \leq 2$. Details of the first optical compensation layer and the second optical compensation layer will be described in sections A-2 and A-3 below.

In the present invention, as shown in FIG. 2, the first optical compensation layer 13 is laminated such that its slow axis B forms a predetermined angle α with an absorption axis A of the polarizer 11. The angle α is +17° to +27° or −17° to −27°, preferably +19° to +25° or −19° to −25', more preferably +21° to +24° or −21° to −24°, and most preferably +22° to +23° or −22° to −23° with respect to the absorption axis A of the polarizer 11. The second optical compensation layer 14 is laminated such that its slow axis C forms a predetermined angle β with the absorption axis A of the polarizer 11. The angle β is +85° to +95°, preferably +87° to +93°, more preferably +88° to +92', and most preferably +89° to +91° with respect to the absorption axis A of the polarizer 11. Two specific optical compensation layers may be laminated in such a specific positional relationship, to thereby remarkably prevent light leak in black display of a liquid crystal display apparatus of VA mode (reflective or semi-transmissive VA mode, in particular).

A total thickness of the optical film of the present invention is preferably 40 to 150 μm, more preferably 40 to 130 μm, and most preferably 40 to 100 μm. According to the present invention, two optical compensation layers can favorably prevent light leak in an image display apparatus. According to the present invention, the first optical compensation layer is formed of a liquid crystal material (described below), to thereby remarkably reduce the thickness of the first optical compensation layer serving as a λ/2 plate compared with that of a conventional first optical compensation layer. Further, the second optical compensation layer is formed of a specific polymer material and by a specific production method (described below), to thereby remarkably reduce the thickness of the second optical compensation layer serving as a λ/4 plate compared with that of a conventional second optical compensation layer. As a result, the optical film of the present invention may have a very small total thickness compared with that of an equivalent conventional optical film. Further, the optical film of the present invention may greatly contribute to reduction in thickness of an image display apparatus.

A-2. First Optical Compensation Layer

The first optical compensation layer 13 has a refractive index profile of nx>ny=nz as described above. Preferably, the first optical compensation layer 13 may serve as a λ/2 plate. The first optical compensation layer serves as a λ/2 plate, to thereby appropriately adjust retardation in wavelength dispersion properties (in particular, in a wavelength range where the retardation departs from λ/4) of the second optical compensation layer serving as a λ/4 plate. Such a first optical compensation layer has an in-plane retardation $Re_1$ of preferably 200 to 300 nm, more preferably 220 to 280 nm, and most preferably 230 to 270 nm.

A thickness of the first optical compensation layer may be set such that it serves as a λ/2 plate most appropriately. That is, the thickness thereof is set to provide a desired in-plane retardation. Specifically, the thickness of the first optical compensation layer is preferably 0.5 to 5 μm, more preferably 1 to 4 μm, and most preferably 1.5 to 3 μm.

Any appropriate material may be employed as a material used for forming the first optical compensation layer as long as the above-mentioned properties can be obtained. A liquid crystal material is preferred, and a liquid crystal material having a crystal phase of a nematic phase (nematic liquid crystals) is more preferred. Use of the liquid crystal material remarkably increases a difference between nx and ny of the optical compensation layer to be obtained compared with the case using a non-liquid crystal material. As a result, the thickness of the optical compensation layer can be remarkably reduced for obtaining a desired in-plane retardation. Examples of the liquid crystal material that may be used include a liquid crystal polymer and a liquid crystal monomer. The liquid crystal polymer and the liquid crystal monomer may be used in combination. The liquid crystal material may exhibit liquid crystallinity through a lyotropic or thermotropic mechanism. Further, liquid crystals are preferably aligned in homogeneous alignment.

A liquid crystal monomer used as the liquid crystal material is preferably a polymerizable monomer and/or a crosslinking monomer, for example. As described below, this is because the alignment state of the liquid crystal material can be fixed by polymerizing or crosslinking the polymerizable monomer or the crosslinking monomer. The alignment state of the liquid crystal monomer can be fixed by aligning the liquid crystal monomer, and then polymerizing or crosslinking the liquid crystal monomers (the polymerizable monomer or the crosslinking monomer), for example. A polymer is formed through polymerization, and a three-dimensional network structure is formed through crosslinking. However, the polymer and the three-dimensional network structure exhibit non-liquid crystallinity. Thus, the formed first optical compensation layer will not undergo phase transition into a liquid crystal phase, a glass phase, or a crystal phase by change in temperature, which is specific to a liquid crystal compound. As a result, the first optical compensation layer is an optical compensation layer that has excellent stability and is not affected by change in temperature. The polymerizable monomer and the crosslinking monomer may be used in combination.

Any suitable liquid crystal monomers may be employed as the liquid crystal monomer. For example, there are used polymerizable mesogenic compounds and the like described in JP 2002-533742 A (WO 00/37585), EP358208 (U.S. Pat. No. 5,211,877), EP 66137 (U.S. Pat. No. 4,388,453), WO 93/22397, EP 0261712, DE 19504224, DE 4408171, GB 2280445, and the like. Specific examples of the polymerizable mesogenic compounds include: LC242™ available from BASF Aktiengesellschaft; E7™ available from Merck & Co., Inc.; and LC-Silicone-CC3767™ available from Wacker-Chemie GmbH.

For example, a nematic liquid crystal monomer is preferred as the liquid crystal monomer, and a specific example thereof includes a monomer represented by the below-indicated formula (L1). The liquid crystal monomer may be used alone or in combination of two or more thereof.

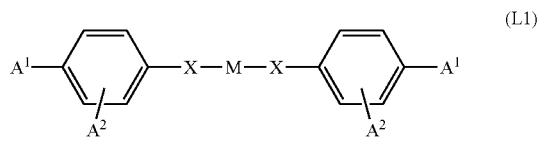
(L1)

In the above formula (L1), $A^1$ and $A^2$ each represent a polymerizable group, and may be the same or different from each other. One of $A^1$ and $A^2$ may represent hydrogen. Each X independently represents a single bond, —O—, —S—, —C=N—, —O—CO—, —CO—O—, —O—CO—O—, —CO—NR—, —NR—CO—, —NR—, —O—CO—NR—, —NR—CO—O—, —CH$_2$—O—, or —NR—CO—NR—. R represents H or an alkyl group having 1 to 4 carbon atoms. M represents a mesogen group.

In the above formula (L1), Xs may be the same or different from each other, but are preferably the same.

Of monomers represented by the above formula (L1), each $A^2$ is preferably arranged in an ortho position with respect to $A^1$.

$A^1$ and $A^2$ are preferably each independently represented by the below-indicated formula (L2), and $A^1$ and $A^2$ preferably represent the same group.

Z—X-(Sp)$_n$ (L2)

In the above formula (L2), Z represents a crosslinkable group, and X is the same as that defined in the above formula (L1). Sp represents a spacer consisting of a substituted or unsubstituted linear or branched alkyl group having 1 to 30 carbon atoms. n represents 0 or 1. A carbon chain in Sp may be interrupted by oxygen in an ether functional group, sulfur in a thioether functional group, a non-adjacent imino group, an alkylimino group having 1 to 4 carbon atoms, or the like.

In the above formula (L2), Z preferably represents any one of functional groups represented by the below-indicated formulae. In the below-indicated formulae, examples of R include a methyl group, an ethyl group, an n-propyl group, an i-propyl group, an n-butyl group, an i-butyl group, and a t-butyl group.

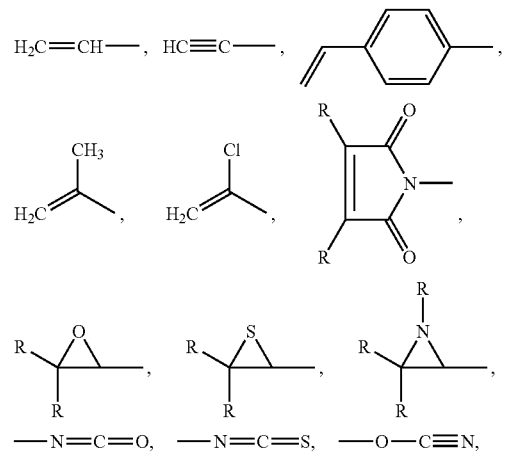

In the above formula (L2), Sp preferably represents any one of structural units represented by the below-indicated formulae. In the below-indicated formulae, m preferably represents 1 to 3, and p preferably represents 1 to 12.

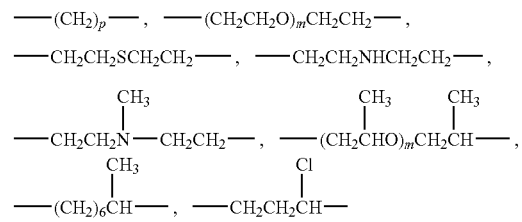

In the above formula (L1), M is preferably represented by the below-indicated formula (L3). In the below-indicated formula (L3), X is the same as that defined in the above formula (L1) Q represents a substituted or unsubstituted linear or branched alkylene group, or an aromatic hydrocarbon group, for example. Q may represent a substituted or unsubstituted linear or branched alkylene group having 1 to 12 carbon atoms, for example.

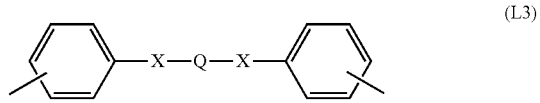
(L3)

In the case where Q represents an aromatic hydrocarbon group, Q preferably represents any one of aromatic hydrocarbon groups represented by the below-indicated formulae or substituted analogues thereof.

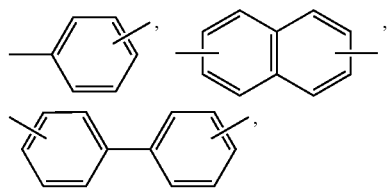

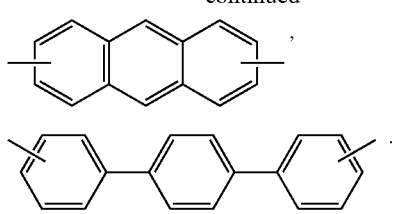

The substituted analogues of the aromatic hydrocarbon groups represented by the above formulae may each have 1 to 4 substituents per aromatic ring, or 1 to 2 substituents per aromatic ring or group. The substituents may be the same or different from each other. Examples of the substituents include: an alkyl group having 1 to carbon atoms; a nitro group; a halogen group such as F, Cl, Br, or I; a phenyl group; and an alkoxy group having 1 to 4 carbon atoms.

Specific examples of the liquid crystal monomer include monomers represented by the following formulae (L4) to (L19).

(L4)
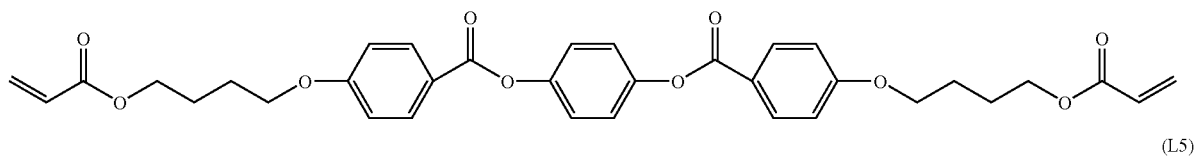

(L5)
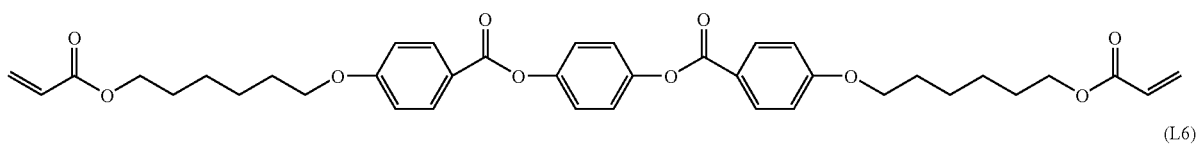

(L6)
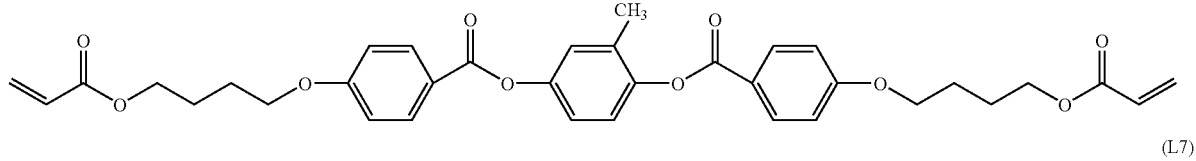

(L7)
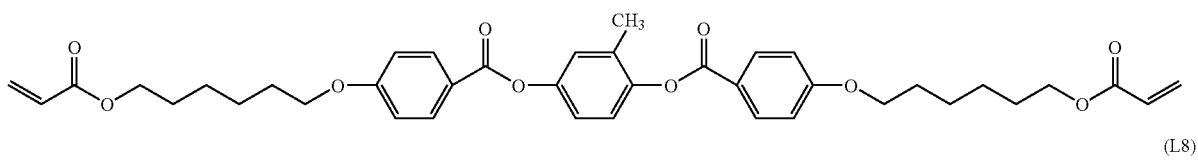

(L8)
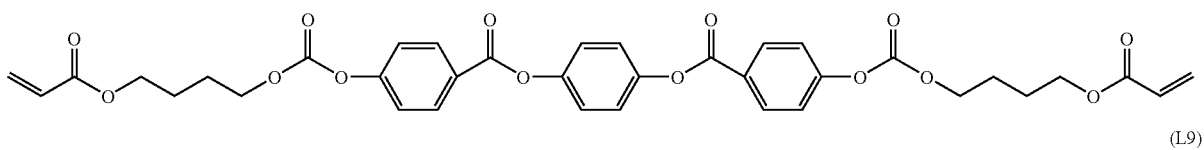

(L9)
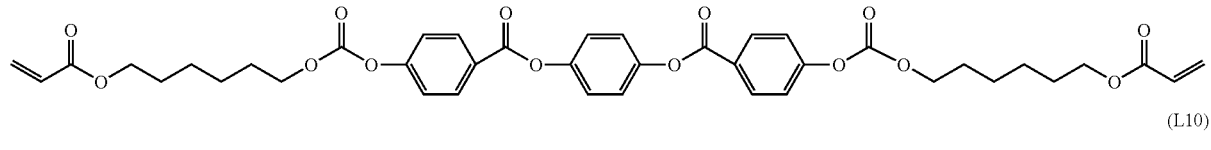

(L10)
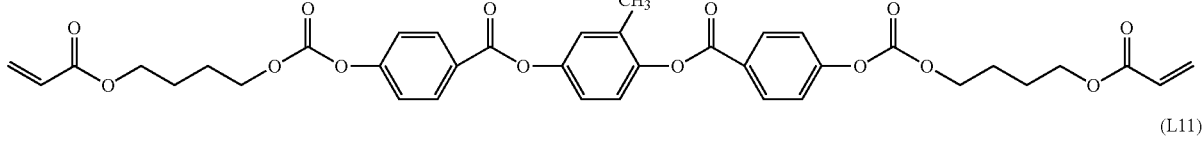

(L11)
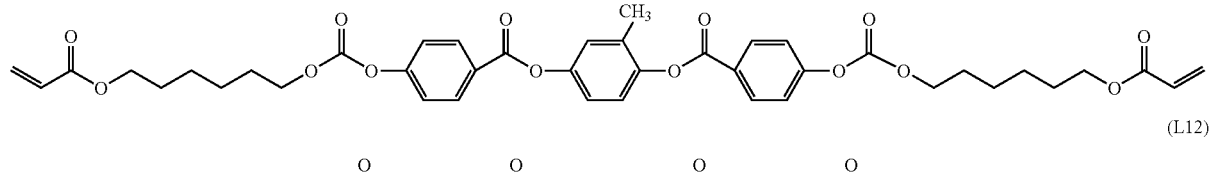

(L12)
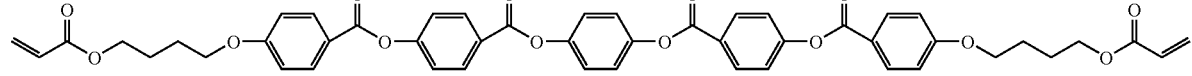

-continued
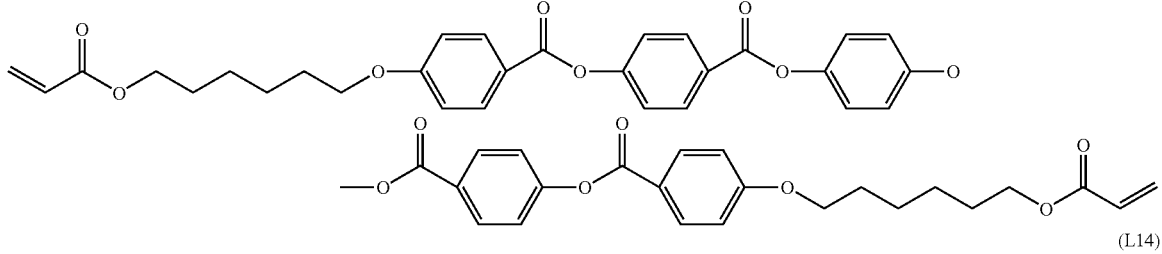
(L13)
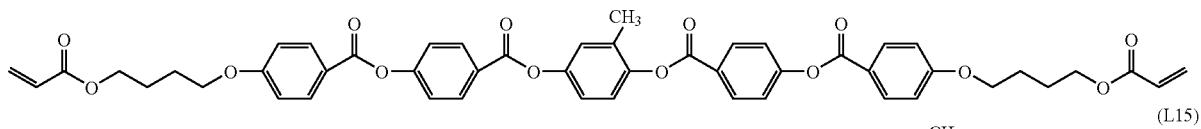
(L14)
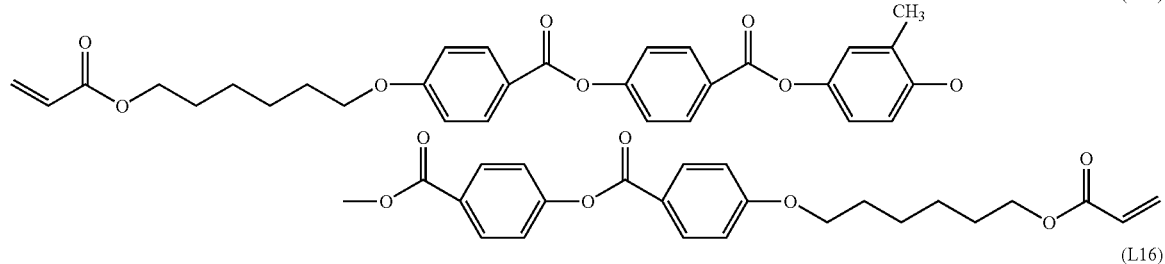
(L15)
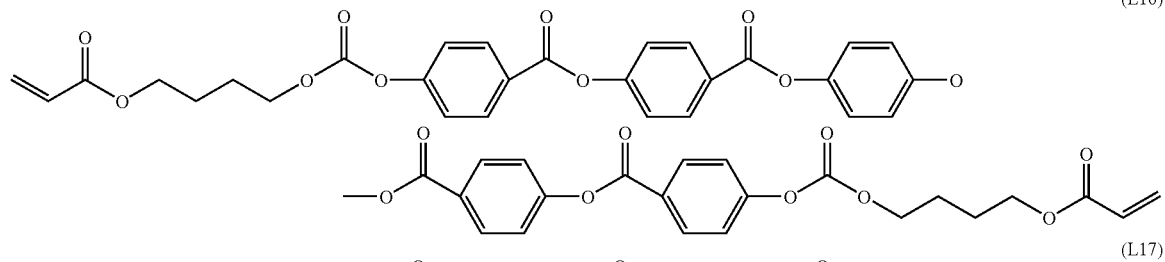
(L16)
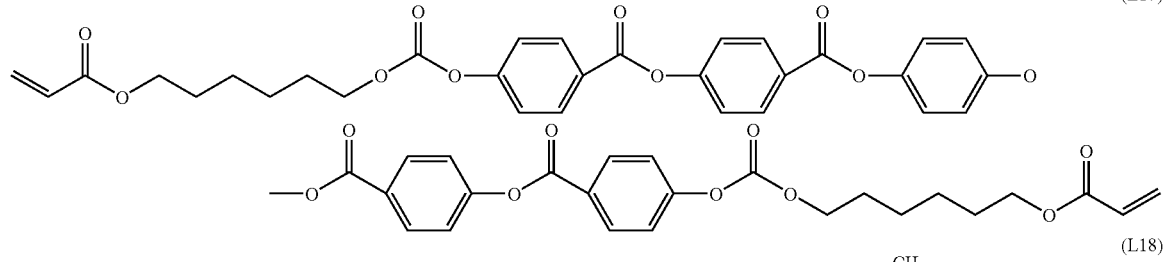
(L17)
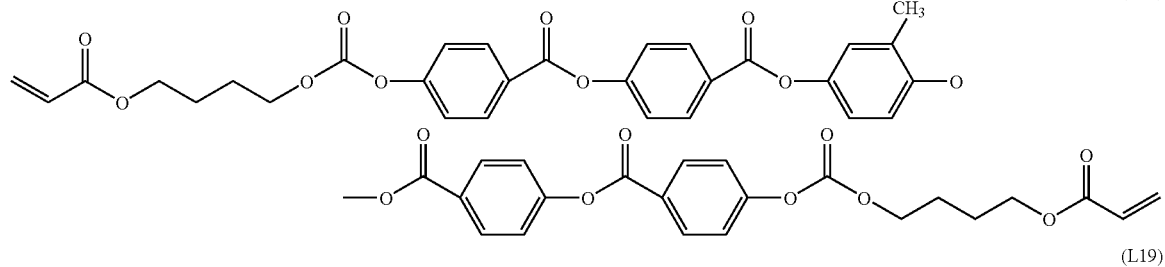
(L18)
(L19)

A temperature range in which the liquid crystal monomer exhibits liquid-crystallinity varies depending on the type of liquid crystal monomer. More specifically, the temperature range is preferably 40 to 120° C., more preferably 50 to 100° C., and most preferably 60 to 90° C.

A-3. Second Optical Compensation Layer

The second optical compensation layer 14 has a refractive index profile of nx>ny>nz. That is, the second optical compensation layer 14 is a biaxial optical compensation layer. Preferably, the second optical compensation layer 14 may serve as a λ/4 plate. For attaining sufficient visual compensation at all wavelengths, wavelength dispersion of the second optical compensation layer is preferably similar to wavelength dispersion of liquid crystals in a liquid crystal cell. According to the present invention, wavelength dispersion properties of the second optical compensation layer serving as a λ/4 plate may be corrected by optical properties of the first optical compensation layer serving as a λ/2 plate, to thereby exhibit a function of circularly polarization in a broad wavelength range. Such a second optical compensation layer has an in-plane retardation $Re_2$ of preferably 90 to 160 nm, more preferably 100 to 150 nm, and most preferably 110 to 140 nm. Further, the second optical compensation layer has a thickness direction retardation $Rth_2$ of preferably 80 to 150 nm, more preferably 90 to 140 nm, and most preferably 100 to 130 nm.

The second optical compensation layer has an Nz coefficient of $1.2 \leq Nz \leq 2$, preferably $1.3 \leq Nz \leq 1.8$, and more preferably $1.4 \leq Nz \leq 1.7$. The Nz coefficient of the second optical compensation layer is adjusted within the above ranges, and thus the second optical compensation layer may serve as a λ/4 plate and may exhibit functions of optical compensation and axial compensation for a liquid crystal cell of VA mode. Thus, contrast of a liquid crystal display apparatus may be improved.

The thickness of the second optical compensation layer may be set such that the second optical compensation layer may most appropriately serve as a λ/4 plate. That is, the thickness may be set such that a desired in-plane retardation can be obtained. More specifically, the thickness is preferably 1 to 10 μm, more preferably 1.2 to 6 μm, and most preferably 1.4 to 3 μm. This thickness is remarkably smaller than the thickness realized by a conventional biaxial λ/4 plate. The small thickness may be realized by subjecting a specific polymer to specific heating or stretching treatment by the production method of the present invention (details of the production method will be described in the section B below).

A material used for forming the second optical compensation layer may employ any appropriate material as long as the optical properties as described above can be obtained. An example of such a material is a non-liquid crystal material. A particularly preferred example thereof is a non-liquid crystal polymer. The non-liquid crystal material differs from a liquid crystal material and may form a film having optical uniaxial property of nx>nz and ny>nz due to its property regardless of alignment property of a substrate. As a result, not only an alignment substrate but also a non-alignment substrate may be used. Further, even in the case where a non-alignment substrate is used, a step of applying an alignment film to its surface, laminating an alignment film thereon, or the like may be omitted.

Examples of the non-liquid crystal material include polymers such as polyamide, polyimide, polyester, polyetherketone, polyamideimide, and polyesterimide because these polymers have excellent heat resistance, chemical resistance, and transparency, and high rigidity. One kind of polymer may be used alone, or the polymers may be used as a mixture of two or more kinds of polymers having different functional groups such as a mixture of polyarylether ketone and polyamide, for example. Of the polymers, polyimide is particularly preferred because of high transparency, high alignment property, and high stretching property. Polyimide has high heat resistance and low thermal expansion, and thus a second optical compensation layer formed of a polyimide is capable of suppressing uneven heating.

A molecular weight of the polymer is not particularly limited. However, the polymer has a weight average molecular weight (Mw) of preferably within a range of 1,000 to 1,000, 000, more preferably within a range of 2,000 to 500,000, for example.

Polyimide which has high in-plane alignment ability and which is soluble in an organic solvent is preferred as polyimide used in the present invention, for example. More specifically, a polymer disclosed in JP 2000-511296 A, containing a condensation polymerization product of 9,9-bis(aminoaryl) fluorene and aromatic tetracarboxylic dianhydride, and containing at least one repeating unit represented by the following formula (1) can be used.

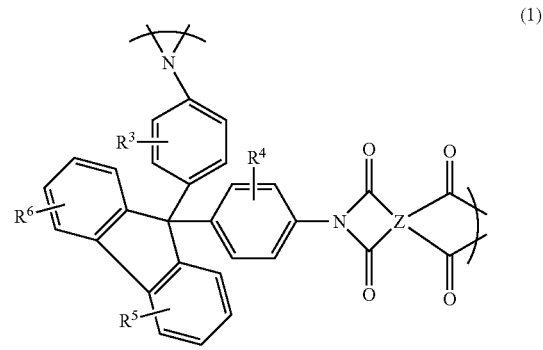

(1)

In the above formula (1), $R^3$ to $R^6$ independently represent at least one type of substituent selected from hydrogen, a halogen, a phenyl group, a phenyl group substituted with 1 to 4 halogen atoms or 1 to 4 alkyl groups each having 1 to 10 carbon atoms, and an alkyl group having 1 to 10 carbon atoms. Preferably, $R^3$ to $R^6$ independently represent at least one type of substituent selected from a halogen, a phenyl group, a phenyl group substituted with 1 to 4 halogen atoms or 1 to 4 alkyl groups each having 1 to 10 carbon atoms, and an alkyl group having 1 to 10 carbon atoms.

In the above formula (1), Z represents a tetravalent aromatic group having 6 to 20 carbon atoms, and preferably represents a pyromellitic group, a polycyclic aromatic group, a derivative of the polycyclic aromatic group, or a group represented by the following formula (2), for example.

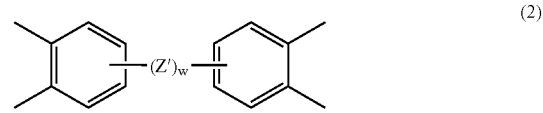

(2)

In the above formula (2), Z' represents a covalent bond, a $C(R^7)_2$ group, a CO group, an O atom, an S atom, an $SO_2$ group, an $Si(C_2H_5)_2$ group, or an $NR^8$ group, for example. A plurality of Z's may be the same or different from each other. w represents an integer of 1 to 10. $R^7$s independently represent hydrogen or a $C(R^9)_3$ group. $R^8$ represents hydrogen, an alkyl group having 1 to about 20 carbon atoms, or an aryl group having 6 to 20 carbon atoms. A plurality of $R^8$s may be the same or different from each other. $R^9$s independently represent hydrogen, fluorine, or chlorine.

An example of the polycyclic aromatic group includes a tetravalent group derived from naphthalene, fluorene, benzofluorene, or anthracene. An example of the substituted derivative of the polycyclic aromatic group includes the above polycyclic aromatic group substituted with at least a group selected from an alkyl group having 1 to 10 carbon atoms, a fluorinated derivative thereof, and a halogen such as F or Cl.

Other examples of the polyimide include: a homopolymer disclosed in JP 08-511812 A and containing a repeating unit represented by the following general formula (3) or (4); and polyimide disclosed therein and containing a repeating unit represented by the following general formula (5). Note that, polyimide represented by the following formula (5) is a preferred form of the homopolymer represented by the following formula (3).

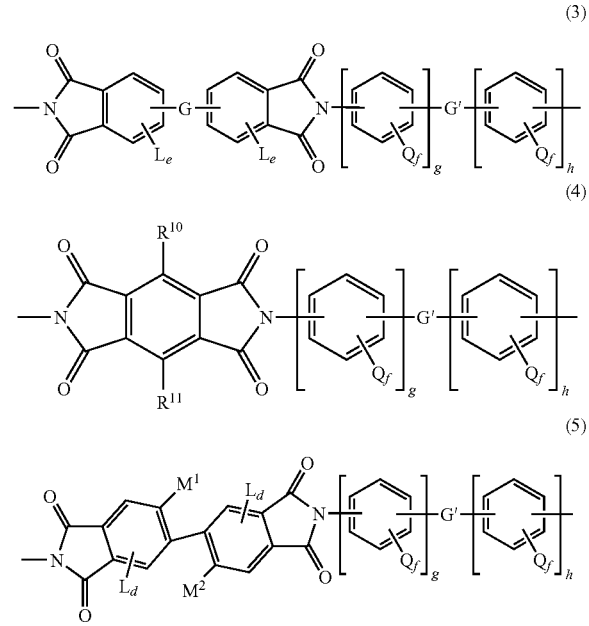

In the above general formulae (3) to (5), G and G' independently represent a covalent bond, a $CH_2$ group, a $C(CH_3)_2$ group, a $C(CF_3)_2$ group, a $C(CX_3)_2$ group (wherein, X represents a halogen), a CO group, an O atom, an S atom, an $SO_2$ group, an Si $(CH_2CH_3)_2$ group, or an $N(CH_3)$ group, for example. G and G' may be the same or different from each other.

In the above formulae (3) and (5), L is a substituent, and d and e each represent the number of the substituents. L represents a halogen, an alkyl group having 1 to 3 carbon atoms, a halogenated alkyl group having 1 to 3 carbon atoms, a phenyl group, or a substituted phenyl group, for example. A plurality of Ls may be the same or different from each other. An example of the substituted phenyl group includes a substituted phenyl group having at least one type of substituent selected from a halogen, an alkyl group having 1 to 3 carbon atoms, and a halogenated alkyl group having 1 to 3 carbon atoms, for example. Examples of the halogen include fluorine, chlorine, bromine, and iodine. d represents an integer of 0 to 2, and e represents an integer of 0 to 3.

In the above formulae (3) to (5), Q is a substituent, and f represents the number of the substituents. Q represents an atom or a group selected from hydrogen, a halogen, an alkyl group, a substituted alkyl group, a nitro group, a cyano group, a thioalkyl group, an alkoxy group, an aryl group, a substituted aryl group, an alkyl ester group, and a substituted alkyl ester group, for example. A plurality of Qs may be the same or different from each other. Examples of the halogen include fluorine, chlorine, bromine, and iodine. An example of the substituted alkyl group includes a halogenated alkyl group. An example of the substituted aryl group includes a halogenated aryl group. f represents an integer of 0 to 4, and g represents an integer of 0 to 3. h represents an integer of 1 to 3. g and h are each preferably larger than 1.

In the above formula (4), $R^{10}$ and $R^{11}$ independently represent an atom or a group selected from hydrogen, a halogen, a phenyl group, a substituted phenyl group, an alkyl group, and a substituted alkyl group. Preferably, $R^{10}$ and $R^{11}$ independently represent a halogenated alkyl group.

In the above formula (5), $M^1$ and $M^2$ independently represent a halogen, an alkyl group having 1 to 3 carbon atoms, a halogenated alkyl group having 1 to 3 carbon atoms, a phenyl group, or a substituted phenyl group, for example. Examples of the halogen include fluorine, chlorine, bromine, and iodine. An example of the substituted phenyl group includes a substituted phenyl group having at least one type of substituent selected from the group consisting of a halogen, an alkyl group having 1 to 3 carbon atoms, and a halogenated alkyl group having 1 to 3 carbon atoms.

A specific example of the polyimide represented by the above formula (3) includes a compound represented by the following formula (6).

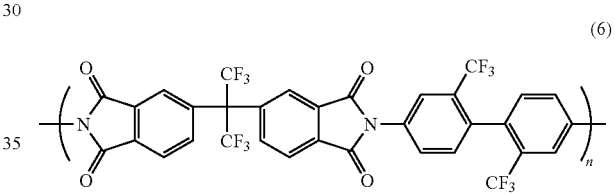

Another example of the polyimide includes a copolymer prepared through any suitable copolymerization of acid dianhydride having a skeleton (repeating unit) other than that as described above and diamine.

An example of the acid dianhydride includes an aromatic tetracarboxylic dianhydride. Examples of the aromatic tetracarboxylic dianhydride include pyromellitic dianhydride, benzophenone tetracarboxylic dianhydride, naphthalene tetracarboxylic dianhydride, heterocyclic aromatic tetracarboxylic dianhydride, and 2,2'-substituted biphenyltetracarboxylic dianhydride.

Examples of the pyromellitic dianhydride include: pyromellitic dianhydride; 3,6-diphenyl pyromellitic dianhydride; 3,6-bis(trifluoromethyl)pyromellitic dianhydride; 3,6-dibromopyromelliticdianhydride; and 3,6-dichloropyromellitic dianhydride. Examples of the benzophenone tetracarboxylic dianhydride include: 3,3',4,4'-benzophenone tetracarboxylic dianhydride; 2,3,3',4-benzophenone tetracarboxylic dianhydride; and 2,2',3,3'-benzophenone tetracarboxylic dianhydride. Examples of the naphthalene tetracarboxylic dianhydride include: 2,3,6,7-naphthalene tetracarboxylic dianhydride; 1,2,5,6-naphthalene tetracarboxylic dianhydride; and 2,6-dichloronaphthalene-1,4,5,8-tetracarboxylic dianhydride. Examples of the heterocyclic aromatic tetracarboxylic dianhydride include: thiophene-2,3,4,5-tetracarboxylic dianhydride; pyrazine-2,3,5,6-tetracarboxylic dianhydride; and pyridine-2,3,5,6-tetracarboxylic dianhydride. Examples of the 2,2'-substituted biphenyltetracarboxylic dianhydride include: 2,2'-dibromo-4,4',5,5'-biphenyltetracarboxylic dianhydride; 2,2'-dichloro-4,4',5,5'-biphenyltetracarboxylic dianhydride; and 2,2'-bis(trifluoromethyl)-4,4',5,5'-biphenyltetracarboxylic dianhydride.

Further examples of the aromatic tetracarboxylic dianhydride include: 3,3',4,4'-biphenyltetracarboxylic dianhydride; bis(2,3-dicarboxyphenyl)methane dianhydride; bis(2,5,6-trifluoro-3,4-dicarboxyphenyl)methane dianhydride; 2,2-bis(3,4-dicarboxyphenyl)-1,1,1,3,3,3-hexafluoropropane dianhydride; 4,4'-bis(3,4-dicarboxyphenyl)-2,2-diphenylpropane dianhydride; bis(3,4-dicarboxyphenyl)ether dianhydride; 4,4'-oxydiphthalic dianhydride; bis(3,4-dicarboxyphenyl)sulfonic dianhydride; 3,3',4,4'-diphenylsulfone tetracarboxylic dianhydride; 4,4'-[4,4'-isopropylidene-di(p-phenyleneoxy)]bis(phthalic anhydride); N,N-(3,4-dicarboxyphenyl)-N-methylamine dianhydride; and bis(3,4-dicarboxyphenyl)diethylsilane dianhydride.

Of those, the aromatic tetracarboxylic dianhydride is preferably 2,2'-substituted biphenyltetracarboxylic dianhydride, more preferably 2,2'-bis(trihalomethyl)-4,4',5,5'-biphenyltetracarboxylic dianhydride, and furthermore preferably 2,2'-bis(trifluoromethyl)-4,4',5,5'-biphenyltetracarboxylic dianhydride.

An example of the diamine includes aromatic diamine. Specific examples of the aromatic diamine include benzenediamine, diaminobenzophenone, naphthalenediamine, heterocyclic aromatic diamine, and other aromatic diamines.

Examples of the benzenediamine include benzenediamines such as o-, m-, or p-phenylenediamine, 2,4-diaminotoluene, 1,4-diamino-2-methoxybenzene, 1,4-diamino-2-phenylbenzene, and 1,3-diamino-4-chlorobenzene. Examples of the diaminobenzophenone include 2,2'-diaminobenzophenone and 3,3'-diaminobenzophenone. Examples of the naphthalenediamine include 1,8-diaminonaphthalene and 1,5-diaminonaphthalene. Examples of the heterocyclic aromatic diamine include 2,6-diaminopyridine, 2,4-diaminopyridine, and 2,4-diamino-S-triazine.

Further examples of the aromatic diamine include: 4,4'-diaminobiphenyl; 4,4'-diaminodiphenylmethane; 4,4'-(9-fluorenylidene)-dianiline; 2,2'-bis(trifluoromethyl)-4,4'-diaminobiphenyl; 3,3'-dichloro-4,4'-diaminodiphenylmethane; 2,2'-dichloro-4,4'-diaminobiphenyl; 2,2',5,5'-tetrachlorobenzidine; 2,2-bis(4-aminophenoxyphenyl)propane; 2,2-bis(4-aminophenyl)propane; 2,2-bis(4-aminophenyl)-1,1,1,3,3,3-hexafluoropropane; 4,4'-diaminodiphenyl ether; 3,4'-diaminodiphenyl ether; 1,3-bis(3-aminophenoxy)benzene; 1,3-bis(4-aminophenoxy)benzene; 1,4-bis(4-aminophenoxy)benzene; 4,4'-bis(4-aminophenoxy)biphenyl; 4,4'-bis(3-aminophenoxy)biphenyl; 2,2-bis[4-(4-aminophenoxy)phenyl]propane; 2,2-bis[4-(4-aminophenoxy)phenyl]-1,1,1,3,3,3-hexafluoropropan e; 4,4'-diaminodiphenyl thioether; and 4,4'-diaminodiphenylsulfone.

An example of the polyetherketone includes polyaryletherketone disclosed in JP 2001-049110 A and represented by the following general formula (7).

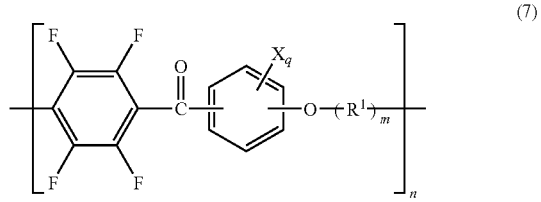

(7)

In the above formula (7), X represents a substituent, and q represents the number of the substituents. X represents a halogen atom, a lower alkyl group, a halogenated alkyl group, a lower alkoxy group, or a halogenated alkoxy group, for example. A plurality of Xs may be the same or different from each other.

Examples of the halogen atom include a fluorine atom, a bromine atom, a chlorine atom, and an iodine atom. Of those, a fluorine atom is preferred. The lower alkyl group is preferably an alkyl group having a straight chain or branched chain of 1 to 6 carbon atoms, more preferably an alkyl group having a straight chain or branched chain of 1 to 4 carbon atoms. More specifically, the lower alkyl group is preferably a methyl group, an ethyl group, a propyl group, an isopropyl group, a butyl group, an isobutyl group, a sec-butyl group, or a tert-butyl group, and particularly preferably a methyl group or an ethyl group. An example of the halogenated alkyl group includes a halide of the above lower alkyl group such as a trifluoromethyl group. The lower alkoxy group is preferably an alkoxy group having a straight chain or branched chain of 1 to 6 carbon atoms, more preferably an alkoxy group having a straight chain or branched chain of 1 to 4 carbon atoms. More specifically, the lower alkoxy group is preferably a methoxy group, an ethoxy group, a propoxy group, an isopropoxy group, a butoxy group, an isobutoxy group, a sec-butoxy group, or a tert-butoxy group, and particularly preferably a methoxy group or an ethoxy group. An example of the halogenated alkoxy group includes a halide of the above lower alkoxy group such as a trifluoromethoxy group.

In the above formula (7), q is an integer of 0 to 4. In the above formula (7), preferably, q=0, and a carbonyl group and an oxygen atom of ether bonded to both ends of a benzene ring are located in para positions.

In the above formula (7), $R^1$ is a group represented by the following formula (8), and m is an integer of 0 or 1.

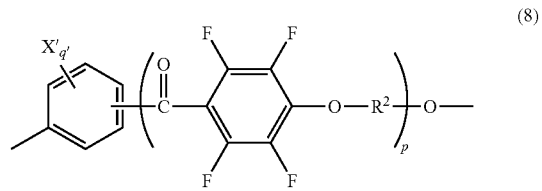

(8)

In the above formula (8), X' represents a substituent which is the same as X in the above formula (7), for example. In the above formula (8), a plurality of X's may be the same or different from each other. q' represents the number of the substituents X'. q' is an integer of 0 to 4, and q' is preferably 0. p is an integer of 0 or 1.

In the above formula (8), R represents a divalent aromatic group. Examples of the divalent aromatic group include: an o-, m-, or p-phenylene group; and a divalent group derived from naphthalene, biphenyl, anthracene, o-, m-, or p-terphenyl, phenanthrene, dibenzofuran, biphenyl ether, or biphenyl sulfone. In the divalent aromatic group, hydrogen directly bonded to an aromatic group may be substituted with a halogen atom, a lower alkyl group, or a lower alkoxy group. Of those, $R^2$ is preferably an aromatic group selected from groups represented by the following formulae (9) to (15).

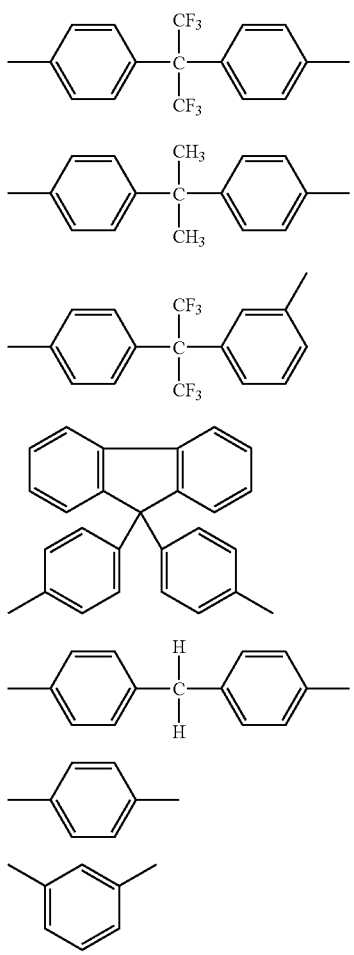

(9)

(10)

(11)

(12)

(13)

(14)

(15)

In the above formula (7), $R^1$ is preferably a group represented by the following formula (16). In the following formula (16), $R^2$ and p are defined as those in the above formula (8).

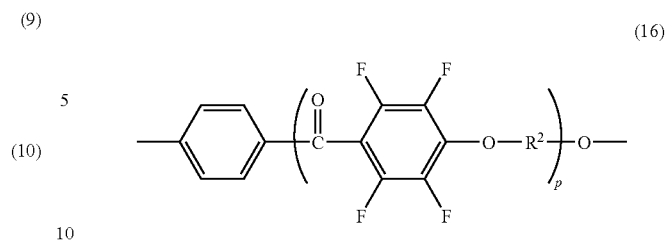

(16)

In the above formula (7), n represents a degree of polymerization. n falls within a range of 2 to 5,000, preferably within a range of 5 to 500, for example. Polymerization may involve polymerization of repeating units of the same structure or polymerization of repeating units of different structures. In the latter case, a polymerization form of the repeating units may be block polymerization or random polymerization.

Terminals of the polyaryletherketone represented by the above formula (7) are preferably a fluorine atom on a p-tetrafluorobenzoylene group side and a hydrogen atom on an oxyalkylene group side. Such polyaryletherketone can be represented by the following general formula (17), for example. In the following formula (17), n represents the same degree of polymerization as that in the above formula (7).

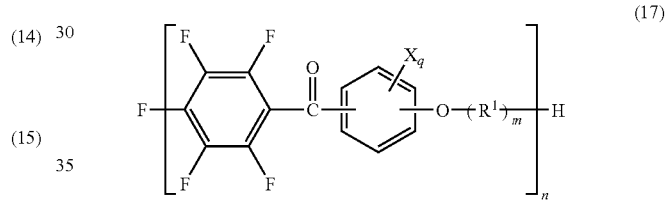

(17)

Specific examples of the polyaryletherketone represented by the above formula (7) include compounds represented by the following formulae (18) to (21). In each of the following formulae, n represents the same degree of polymerization as that in the above formula (7).

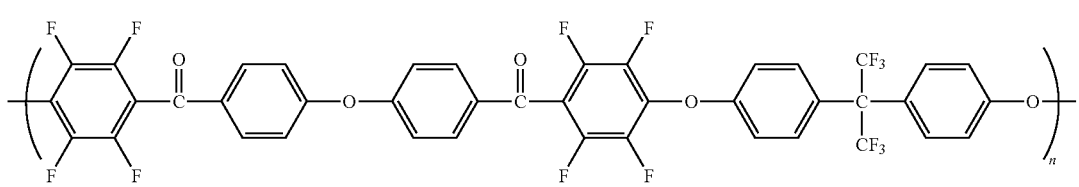

(18)

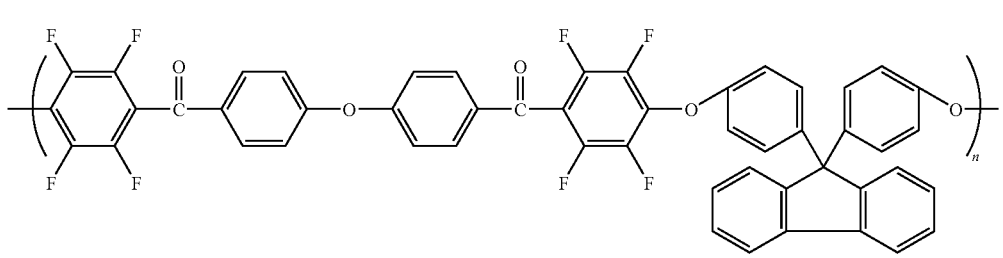

(19)

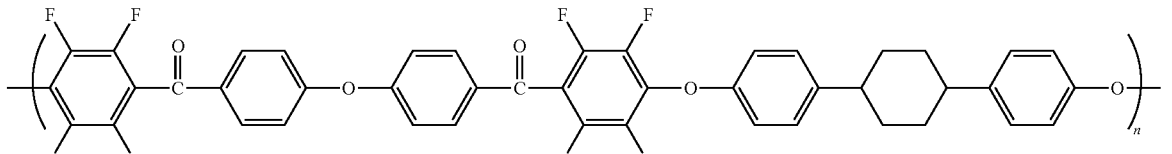

(20)

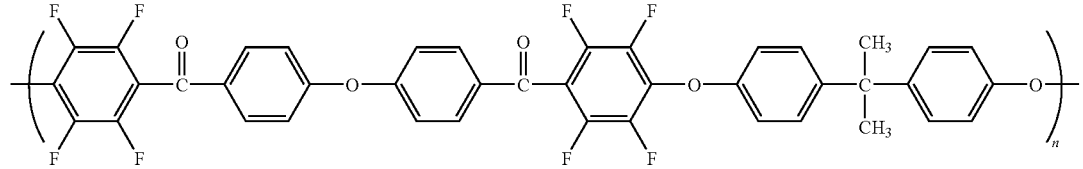

(21)

In addition, an example of polyamide or polyester includes polyamide or polyester disclosed in JP 10-508048 A. A repeating unit thereof can be represented by the following general formula (22), for example.

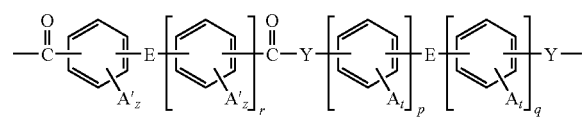

(22)

In the above formula (22), Y represents O or NH. E represents at least one selected from a covalent bond, an alkylene group having 2 carbon atoms, a halogenated alkylene group having 2 carbon atoms, a $CH_2$ group, a $C(CX_3)_2$ group (wherein, X is a halogen or hydrogen), a CO group, an O atom, an S atom, an $SO_2$ group, an $Si(R)_2$ group, and an N(R) group, for example. A plurality of Es may be the same or different from each other. In E, R is at least one of an alkyl group having 1 to 3 carbon atoms and a halogenated alkyl group having 1 to 3 carbon atoms, and is located in a meta or para position with respect to a carbonyl functional group or a Y group.

In the above formula (22), A and A' each represent a substituent, and t and z represent the numbers of the respective substituents. p represents an integer of 0 to 3, and q represents an integer of 1 to 3. r represents an integer of 0 to 3.

A is selected from hydrogen, a halogen, an alkyl group having 1 to 3 carbon atoms, a halogenated alkyl group having 1 to 3 carbon atoms, an alkoxy group represented by OR (wherein, R is defined as above), an aryl group, a substituted aryl group prepared through halogenation or the like, an alkoxycarbonyl group having 1 to 9 carbon atoms, an alkylcarbonyloxy group having 1 to 9 carbon atoms, an aryloxycarbonyl group having 1 to 12 carbon atoms, an arylcarbonyloxy group having 1 to 12 carbon atoms and its substituted derivatives, an arylcarbamoyl group having 1 to 12 carbon atoms, and arylcarbonylamino group having 1 to 12 carbon atoms and its substituted derivatives, for example. A plurality of As may be the same or different from each other. A' is selected from a halogen, an alkyl group having 1 to 3 carbon atoms, a halogenated alkyl group having 1 to 3 carbon atoms, a phenyl group, and a substituted phenyl group, for example. A plurality of A's may be the same or different from each other. Examples of the substituent on a phenyl ring of the substituted phenyl group include a halogen, an alkyl group having 1 to 3 carbon atoms, a halogenated alkyl group having 1 to 3 carbon atoms, and the combination thereof. t represents an integer of 0 to 4, and z represents an integer of 0 to 3.

The repeating unit of the polyamide or polyester represented by the above formula (22) is preferably a repeating unit represented by the following general formula (23).

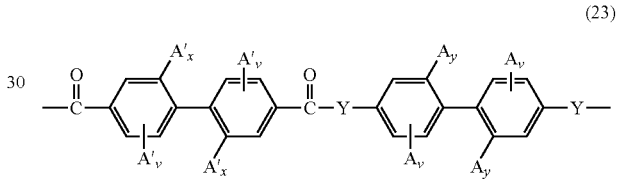

(23)

In the above formula (23), A, A', and Y are defined as those in the above formula (22). v represents an integer of 0 to 3, preferably an integer of 0 to 2. x and y are each 0 or 1, but are not both 0.

A-4. Polarizer

Any appropriate polarizer may be employed as the polarizer 11 in accordance with the purpose. Examples thereof include: a film prepared by adsorbing a dichromatic substance such as iodine or a dichromatic dye on a hydrophilic polymer film such as a polyvinyl alcohol-based film, a partially formalized polyvinyl alcohol-based film, or a partially saponified ethylene/vinyl acetate copolymer-based film and uniaxially stretching the film; and a polyene-based alignment film formed of a polyene obtained from a dehydrated product of a polyvinyl alcohol, a dehydrochlorinated product of a polyvinyl chloride, or the like. Of those, a polarizer prepared by adsorbing a dichromatic substance such as iodine on a polyvinyl alcohol-based film and uniaxially stretching the film is particularly preferable because of high-polarized dichromaticity. A thickness of the polarizer is not particularly limited, but is generally about 1 to 80 μm.

The polarizer prepared by adsorbing iodine on a polyvinyl alcohol-based film and uniaxially stretching the film may be produced by, for example: immersing a polyvinyl alcohol-based film in an aqueous solution of iodine for coloring; and stretching the film to 3 to 7 times length of the original length. The aqueous solution may contain boric acid, zinc sulfate, zinc chloride, or the like as required, or the polyvinyl alcohol-based film may be immersed in an aqueous solution of potassium iodide or the like. Further, the polyvinyl alcohol-based film may be immersed and washed in water before coloring as required.

Washing the polyvinyl alcohol-based film with water not only allows removal of contamination on a film surface of the polyvinyl alcohol-based film or washing away of an anti-blocking agent, but also provides an effect of preventing nonuniformity such as uneven coloring by swelling of the polyvinyl alcohol-based film. The stretching of the film may be performed after coloring of the film with iodine, may be performed during coloring of the film, or may be performed followed by coloring of the film with iodine. The stretching may be performed in an aqueous solution of boric acid or potassium iodide, or in a water bath.

A-5. Protective Layer (Protective Film)

The protective layers 12 and 15 are each formed of any appropriate film that can be used as a protective layer for a polarizing plate. It is preferable that the protective layer be transparent protective film. Specific examples of a material used as a main component of the film include transparent resins such as a cellulose-based resin such as triacetylcellulose (TAC), a polyester-based resin, a polyvinyl alcohol-based resin, a polycarbonate-based resin, a polyamide-based resin, a polyimide-based resin, a polyether sulfone-based resin, a polysulfone-based resin, a polystyrene-based resin, a polynorbornene-based resin, a polyolefin-based resin, an acrylic resin, and an acetate-based resin. Another example thereof includes an acryl-based, urethane-based, acrylic urethane-based, epoxy-based, or silicone-based heat-curable-resin or UV-curing-resin. Still another example thereof includes a glassy polymer such as a siloxane-based polymer. Further, a polymer film described in JP 2001-343529 A (WO 01/37007) may also be used. More specifically, the film is formed of a resin composition containing a thermoplastic resin having a substituted or unsubstituted imide group on a side chain, and a thermoplastic resin having a substituted or unsubstituted phenyl group and a nitrile group on a side chain. A specific example thereof includes a resin composition containing an alternate copolymer of isobutene and N-methylmaleimide, and an acrylonitrile/styrene copolymer. The polymer film may be an extruded product of the above-mentioned resin composition, for example. Of those, TAC, a polyimide-based resin, a polyvinyl alcohol-based resin, a glassy polymer is preferable, and TAC is further preferable.

It is preferable that the protective layer be transparent and have no color. More specifically, the protective layer has a thickness direction retardation Rth of preferably −90 nm to +90 nm, more preferably −80 nm to +80 nm, and most preferably −70 nm to +70 nm.

The protective layer has any appropriate thickness as long as the preferable thickness direction retardation can be obtained. Specifically, the thickness of the protective film is preferably 5 mm or less, more preferably 1 mm or less, particularly preferably 1 to 500 µm, and most preferably 5 to 150 µm.

The protective layers 12 and 15 may be identical to or different from each other. The protective layer 15 may be subjected to hard coat treatment, antireflection treatment, anti-sticking treatment, antiglare treatment, and the like as required.

A-6. Other Structural Components of Polarizing Plate

The optical film of the present invention may be provided with other optical layers. As the other optical layers, any appropriate optical layers may be employed in accordance with the purpose and the types of image display apparatus. Specific examples thereof include a liquid crystal film, a light scattering film, a diffraction film, and another optical compensation layer (retardation film).

The optical film of the present invention may further include a pressure-sensitive adhesive layer or adhesive layer as an outermost layer on at least one side thereof. In this way, the optical film includes the pressure-sensitive adhesive layer or adhesive layer as an outermost layer, to thereby facilitate lamination with another member (for example, a liquid crystal cell) and prevent peeling off of the optical film of the present invention from another member. A material used for forming the pressure-sensitive adhesive layer or adhesive layer may employ any appropriate material. Preferably, a material having excellent moisture absorption property or excellent heat resistance is used for preventing foaming or peeling off due to moisture absorption, degradation in optical properties due to difference in thermal expansion or the like, warping of the liquid crystal cell, and the like.

For practical use, a surface of the pressure-sensitive adhesive layer or adhesive layer is covered by any appropriate separator to prevent contamination until the optical film of the present invention is actually used. The separator may be formed by a method of providing a release coat on any appropriate film by using a releasing agent such as a silicone-based, long chain alkyl-based, or fluorine-based releasing agent, molybdenum sulfide, or the like as required.

Each of the layers of the optical film of the present invention may be subjected to treatment with a UV absorbing agent such as a salicylic ester-based compound, a benzophenone-based compound, a benzotriazole-based compound, a cyanoacrylate-based compound, or a nickel complex-based compound, to thereby impart UV absorbing property.

B. Method of Producing Optical Film

A method of producing an optical film of the present invention includes the steps of: subjecting a surface of the transparent protective film (T) 12 (eventually, a protective layer) to alignment treatment; forming the first optical compensation layer 13 on the surface of the transparent protective film (T) subjected to the alignment treatment; laminating the polarizer 11 on the surface of the transparent protective film (T); and forming the second optical compensation layer 14 on the surface of the first optical compensation layer. In the production method of the present invention, the polarizer and the first optical compensation layer are arranged on opposite sides through the transparent protective film (T). In the production method of the present invention, the first optical compensation layer 13 is formed such that an angle formed between a slow axis of the first optical compensation layer and an absorption axis of the polarizer is +17° to +27° or −17° to −27°, and the second optical compensation layer 14 is formed such that an angle formed between a slow axis of the second optical compensation layer and the absorption axis of the polarizer is +85° to +95° According to such a production method, an optical film shown in FIGS. 1 and 2 may be obtained, for example. The order of the respective steps described above, and/or the films to be subjected to alignment treatment may appropriately be changed in accordance with the purpose. For example, a step of laminating a polarizer may be conducted after the step of forming any optical compensation layer or the step of laminating any optical compensation layer. Further, the transparent protective film may be subjected to alignment treatment, or any appropriate substrate may be subjected to alignment treatment, for example. In the case where the substrate is subjected to alignment treatment, a film (the first optical compensation layer, more specifically) formed on the substrate may be transferred (laminated) in an appropriate order in accordance with a desired laminate structure of the optical film. Hereinafter, detailed descriptions of the respective steps will be given.

B-1. Alignment Treatment for Transparent Protective Film

A surface of a transparent protective film (T) 12 (eventually, a protective layer) is subjected to alignment treatment, and an application liquid containing a predetermined liquid crystal material is applied onto the surface, to thereby form the first optical compensation layer 13 having a slow axis B at an angle α with respect to the absorption axis of the polarizer 11 as shown in FIG. 2 (the step of forming a first optical compensation layer is described below).

Any appropriate alignment treatment may be employed as the alignment treatment for the transparent protective film (T). Specific examples of the alignment treatment include rubbing treatment, oblique deposition method, stretching treatment, optical alignment treatment, magnetic field alignment treatment, and electric field alignment treatment. The rubbing treatment is preferable. Any appropriate conditions may be employed as conditions for various alignment treatments depending on the purpose.

The alignment direction of the alignment treatment refers to a direction at a predetermined angle with respect to the absorption axis of the polarizer when the transparent protective film (T) and the polarizer are laminated. The alignment direction is substantially the same as the direction of the slow axis B of a first optical compensation layer 13 to be formed as described below. Thus, the predetermined angle is +17° to +27° or −17° to −27°, preferably +19° to +25° or −19° to −25°, more preferably +21° to +24° or −21° to −24°, and most preferably +22° to +23° or −22° to −23°.

The alignment treatment at the predetermined angle with respect to a continuous transparent protective film (T) involves treatment in a longitudinal direction of the continuous transparent protective film (T) and treatment in an oblique direction (more specifically, direction at the predetermined angle) with respect to the longitudinal direction or direction perpendicular thereto (width direction) of the continuous protective film (T) The polarizer is produced by stretching the polymer film colored with a dichromatic substance as described above, and has an absorption axis in the stretching direction. For mass production of the polarizer, a continuous polymer film is prepared and is continuously stretched in a longitudinal direction. In a case where a continuous polarizer and a continuos transparent protective film (T) are attached together, longitudinal directions thereof are in the direction of the absorption axis of the polarizer. Thus, in order to align the transparent protective film (T) in a direction at the predetermined angle with respect to the absorption axis of the polarizer, the transparent protective film is desirably subjected to the alignment treatment in an oblique direction. The direction of the absorption axis of the polarizer and the longitudinal directions of the continuous films (polarizer and transparent protective film (T)) are substantially the same, and thus the direction of the alignment treatment may be at the predetermined angle with respect to the longitudinal directions. Meanwhile, in a case where the treatment is performed in a longitudinal direction or width direction of the transparent protective film, the transparent protective film must be cut out in an oblique direction and then laminated. As a result, angles between optical axes may vary by cut-out film, which may result in variation in quality by product, production requiring high cost and long time, increased waste, and difficulties in production of large films.

The transparent protective film (T) may be directly subjected to the alignment treatment. Alternatively, any appropriate alignment layer (in general, a polyimide layer, a polyvinyl alcohol layer, or a silane-coupling layer) may be formed, and the alignment layer may be subjected to the alignment treatment. For example, rubbing treatment is preferably directly performed on the surface of the transparent protective film because the rubbing treatment on the alignment layer involves the following disadvantages in formation of the alignment layer. In a case where the alignment layer is a polyimide film: (1) a solvent which does not corrode the transparent protective film must be selected, thereby causing difficulties in selection of a solvent for a composition forming the alignment layer; and (2) curing is required at high temperatures (150 to 300° C., for example), thereby possibly providing an elliptically polarizing plate to be obtained with a bad appearance. In a case where the alignment layer is a polyvinyl alcohol layer, thermal resistance and humidity resistance of the alignment layer are insufficient, and the transparent protective film and the alignment layer may peel off in a high temperature and high humidity environment, thereby possibly causing clouding. In a case where the alignment layer is a silane coupling agent layer, a liquid crystal layer (first optical compensation layer) to be formed is easily inclined, thereby possibly inhibiting realization of the desired positive uniaxial characteristics.

B-2. Step of Applying Liquid Crystal Material Forming First Optical Compensation Layer Next, an application liquid containing a liquid crystal material as described in the section A-2 is applied onto a surface of the transparent protective film (T) subjected to the alignment treatment. Then, the liquid crystal material is aligned to form the first optical compensation layer. More specifically, an application liquid having a liquid crystal material dissolved or dispersed in an appropriate solvent may be prepared, and the application liquid may be applied onto the surface of the transparent protective film (T) subjected to the alignment treatment. The step of aligning the liquid crystal material is described in the section B-3 below.

Any appropriate solvent which may dissolve or disperse the liquid crystal material may be employed as the solvent. The type of solvent to be used may be appropriately selected in accordance with the type of liquid crystal material or the like. Specific examples of the solvent include: halogenated hydrocarbons such as chloroform, dichloromethane, carbon tetrachloride, dichloroethane, tetrachloroethane, methylene chloride, trichloroethylene, tetrachloroethylene, chlorobenzene, and orthodichlorobenzene; phenols such as phenol, p-chlorophenol, o-chlorophenol, m-cresol, o-cresol, and p-cresol; aromatic hydrocarbons such as benzene, toluene, xylene, mesitylene, methoxybenzene, and 1,2-dimethoxybenzene; ketone-based solvents such as acetone, methyl ethyl ketone (MEK), methyl isobutyl ketone, cyclohexanone, cyclopentanone, 2-pyrrolidone, and N-methyl-2-pyrrolidone; ester-based solvents such as ethyl acetate, butyl acetate, and propyl acetate; alcohol-based solvents such as t-butyl alcohol, glycerin, ethylene glycol, triethylene glycol, ethylene glycol monomethyl ether, diethylene glycol dimethyl ether, propylene glycol, dipropylene glycol, and 2-methyl-2, 4-pentanediol; amide-based solvents such as dimethylformamide and dimethylacetamide; nitrile-based solvents such as acetonitrile and butyronitrole; ether-based solvents such as diethyl ether, dibutyl ether, tetrahydrofuran, and dioxane; and carbon disulfide, ethyl cellosolve, butyl cellosolve, and ethyl cellosolve acetate. Of those, toluene, xylene, mesitylene, MEK, methyl isobutyl ketone, cyclohexanone, ethyl cellosolve, butyl cellosolve, ethyl acetate, butyl acetate, propyl acetate, and ethyl cellosolve acetate are preferable. The solvent may be used alone or in combination of two or more types thereof.

A content of the liquid crystal material in the application liquid may be appropriately determined in accordance with the type of liquid crystal material, the thickness of the target layer, and the like. More specifically, the content of the liquid crystal material is preferably 5 to 50 wt %, more preferably 10 to 40 wt %, and most preferably 15 to 30 wt %.

The application liquid may further contain any appropriate additive as required. Specific examples of the additive include a polymerization initiator and a crosslinking agent. Those additives are particularly preferably used when a liquid crystal monomer (a polymerizable monomer or a crosslinking monomer) is used as the liquid crystal material. Specific examples of the polymerization initiator include benzoylperoxide (BPO) and azobisisobutyronitrile (AIBN). Specific examples of the crosslinking agent include an isocyanate-based crosslinking agent, an epoxy-based crosslinking agent, and a metal chelate crosslinking agent. The additive may be used alone or in combination of two or more thereof. Specific examples of other additives include an antioxidant, a modifier, a surfactant, a dye, a pigment, a discoloration inhibitor, and a UV absorber. The additive may be used alone or in combination of two or more thereof. Examples of the antioxidant include a phenol-based compound, an amine-based compound, an organic sulfur-based compound, and a phosphine-based compound. Examples of the modifier include glycols, silicones, and alcohols. The surfactant is used for smoothing a surface of an optical film, for example. Specific examples thereof include a silicone-based surfactant, an acrylic surfactant, and a fluorine-based surfactant.

An application amount of the application liquid may be appropriately determined in accordance with a concentration of the application liquid, the thickness of the target layer, and the like. In a case where the concentration of the liquid crystal material is 20 wt % in the application liquid, the application amount is preferably 0.03 to 0.17 ml, more preferably 0.05 to 0.15 ml, and most preferably 0.08 to 0.12 ml per 100 cm$^2$ of the transparent protective film.

Any appropriate application method may be employed, and specific examples thereof include roll coating, spin coating, wire bar coating, dip coating, extrusion, curtain coating, and spray coating.

B-3. Step of Aligning Liquid Crystal Material Forming First Optical Compensation Layer Next, the liquid crystal material forming the first optical compensation layer is aligned in accordance with the alignment direction of the surface of the transparent protective film (T). The liquid crystal material is aligned through treatment at a temperature exhibiting a liquid crystal phase in accordance with the type of liquid crystal material used. The treatment at such a temperature allows the liquid crystal material to be in a liquid crystal state, and the liquid crystal material is aligned in accordance with the alignment direction of the surface of the transparent protective film (T). Thus, birefringence is caused in the layer formed through application, to thereby form the first optical compensation layer.

A treatment temperature may be appropriately determined in accordance with the type of liquid crystal material. More specifically, the treatment temperature is preferably 40 to 120° C., more preferably 50 to 100° C., and most preferably 60 to 90° C. A treatment time is preferably 30 seconds or more, more preferably 1 minute or more, particularly preferably 2 minutes or more, and most preferably 4 minutes or more. The treatment time of less than 30 seconds may provide an insufficient liquid crystal state of the liquid crystal material. Meanwhile, the treatment time is preferably 10 minutes or less, more preferably 8 minutes or less, and most preferably 7 minutes or less. The treatment time exceeding 10 minutes may cause sublimation of additives.

In a case where the liquid crystal monomer (a polymerizable monomer and/or a crosslinking monomer) as described in the section A-2 is used as the liquid crystal material, the layer formed through the application is preferably subjected to polymerization treatment or crosslinking treatment. The polymerization treatment allows the liquid crystal monomer to polymerize and to be fixed as a repeating unit of a polymer molecule. The crosslinking treatment allows the liquid crystal monomer to form a three-dimensional structure and to be fixed as a part of a crosslinked structure. As a result, the alignment state of the liquid crystal material is fixed. The polymer or three-dimensional structure formed through polymerization or crosslinking of the liquid crystal monomer is "non-liquid crystal". Thus, the formed first optical compensation layer will not undergo phase transition into a liquid crystal phase, a glass phase, or a crystal phase by change in temperature, which is specific to a liquid crystal molecule. As a result, it is possible to obtain a first optical compensation layer, which is not affected by temperature, having a significantly excellent stability.

A specific procedure for the polymerization treatment or crosslinking treatment may be appropriately selected in accordance with the type of polymerization initiator or crosslinking agent to be used. For example, in a case where a photopolymerization initiator or a photocrosslinking agent is used, photoirradiation may be performed. In a case where a UV polymerization initiator or a UV crosslinking agent is used, UV irradiation may be performed. In a case where a thermal polymerization initiator or a thermal crosslinking agent is used, application of heat may be performed. The irradiation time, irradiation intensity, total amount of irradiation, and the like of light or UV light may be appropriately set in accordance with the type of liquid crystal material, the type of transparent protective film (T), the type of alignment treatment, desired characteristics for the first optical compensation layer, and the like. Similarly, the desired heating temperature and heating time can be appropriately set.

Such alignment treatment is performed to align the liquid crystal material in the alignment direction of the transparent protective film (T). Thus, the slow axis B of the first optical compensation layer formed is substantially the same as the alignment direction of the transparent protective film (T). The direction of the slow axis B of the first optical compensation layer is +17° to +27° or –17° to –27°, preferably +19° to +25° or –19° to –25°, more preferably +21° to +24° or –21° to –24°, and most preferably +22° to +23° or –22° to –23° with respect to the longitudinal direction of the transparent protective film (T).

B-4. Step of Laminating Polarizer

The polarizer is laminated on the surface of the transparent protective film (T). The polarizer is laminated at any appropriate time point in the production method of the present invention. For example, the polarizer may be laminated on the transparent protective film (T) in advance, may be laminated after the first optical compensation layer is formed, or may be laminated after the second optical compensation layer is formed. The polarizer and the first optical compensation layer are positioned on opposite sides of the transparent protective film (T).

Any appropriate lamination method (such as adhesion) may be employed as a method of laminating the transparent protective film (T) and the polarizer. The adhesion may be performed by using any appropriate adhesive or pressure sensitive adhesive. The type of adhesive or pressure sensitive adhesive may be appropriately selected in accordance with the type of adherend (that is, a transparent protective film and a polarizer). Specific examples of the adhesive include: acrylic-based, vinyl alcohol-based, silicone-based, polyester-based, polyurethane-based, and polyether-based polymer adhesives; isocyanate-based adhesives; and rubber-based adhesives. Specific examples of the pressure sensitive adhesive include acrylic-based, vinyl alcohol-based, silicone-based, polyester-based, polyurethane-based, polyether-based, isocyanate-based, and rubber-based pressure sensitive adhesives A thickness of the adhesive or pressure sensitive adhesive is not particularly limited, but is preferably 10 to 200 nm, more preferably 30 to 180 nm, and most preferably 50 to 150 nm.

According to the production method of the present invention, the slow axis of the first optical compensation layer may be set in the alignment treatment for the transparent protective film. Thus, a continuous polarizing film (polarizer) stretched in a longitudinal direction (that is, film having an absorption axis in the longitudinal direction) can be used. In other words, a continuous transparent protective film subjected to the alignment treatment at a predetermined angle with respect to its longitudinal direction and a continuous polarizing film (polarizer) may be continuously attached together with the respective longitudinal directions in the same direction (i.e., roll to roll). Thus, an optical film can be obtained at very high production efficiency. According to the method of the present invention, the transparent protective film need not be cut out obliquely with respect to its longitudinal direction (stretching direction) for lamination. As a result, angles of optical axes do not vary by cut-out film, resulting in an optical film without variation in quality between products. Further, no wastes are produced by cutting of the film, and the optical film can be obtained at low cost and production of a large polarizing plate is facilitated.

Note that the direction of the absorption axis of the polarizer is substantially parallel to the longitudinal direction of the continuous film. In the specification of the present invention, the phrase "substantially parallel" includes the case where an angle formed between the longitudinal direction and the direction of the absorption axis is $0°±10°$, preferably $0°±5°$, and more preferably $0°±3°$.

B-5. Step of Forming Second Optical Compensation Layer

The second optical compensation layer is formed on the surface of the first optical compensation layer. A detailed procedure for the step of forming a second optical compensation layer is described below. First, an application liquid containing a material (non-liquid crystal material described in the above section A-3, more specifically; hereinafter, also referred to as an optical compensation layer forming material) used for forming the second optical compensation layer is applied to a substrate sheet. An application method may employ any appropriate method. Specific examples thereof include a spin coating method, a roll coating method, a flow coating method, a printing method, a dip coating method, a flow casting method, a bar coating method, and a gravure printing method.

A concentration of the optical compensation layer forming material in the application liquid of an optical compensation layer forming material may employ any appropriate concentration as long as the optical compensation layer described in the above section A-3 can be obtained and the application liquid can be applied. The application liquid contains the optical compensation layer forming material in an amount of preferably 5 to 50 parts by weight, and more preferably 10 to 40 parts by weight with respect to 100 parts by weight of a solvent. The application liquid having a such concentration range has a viscosity facilitating application. The solvent to be used for the application liquid of an optical compensation layer forming material may appropriately be selected in accordance with the kind of optical compensation layer forming material. Specific examples of the solvent that can be used include the solvents described in the above section B-2. The application liquid may contain various additives such as a stabilizer, a plasticizer, and metals as required. An application amount of the application liquid is adjusted such that the second optical compensation layer has a thickness (that is, the thickness described in the above section A-3) so as to appropriately serve as a λ/4 plate.

The application liquid of an optical compensation layer forming material may contain a resin different from the optical compensation layer forming material as long as optical properties of an optical compensation layer to be obtained are appropriate. Examples of such a resin include various general purpose resins, an engineering plastic, a thermoplastic resin, and a heat-curable resin. Such a resin is used in combination, to thereby allow formation of an optical compensation layer having appropriate mechanical strength and durability in accordance with the purpose.

The substrate sheet may employ any appropriate substrate sheet as long as a second optical compensation layer appropriate for the present invention can be obtained. Typically, the substrate sheet is formed of: a polyester-based polymer such as polyethylene terephthalate or polyethylene naphthalate; a cellulose-based polymer such as diacetyl cellulose or triacetyl cellulose; a polycarbonate-based polymer; an acrylic polymer such as polymethyl methacrylate; a styrene-based polymer such as polystyrene or an acrylonitrile/styrene copolymer; an olefin-based polymer such as polyethylene, polypropylene, polyolefin having a cyclic or norbornene structure, or an ethylene/propylene copolymer; a vinyl chloride-based polymer; an amide-based polymer such as nylon or aromatic polyamide; an imide-based polymer; a sulfone-based polymer; a polyethersulfone-based polymer; a polyetheretherketone-based polymer, a polyphenylene sulfide-based polymer; a vinyl alcohol-based polymer, a vinylidene chloride-based polymer; a vinyl butyral-based polymer; an arylate-based polymer, a polyoxymethylene-based polymer, an epoxy-based polymer; and a blend thereof. Polyethylene terephthalate is preferred. The substrate sheet may be subjected to stretching treatment, recrystallization treatment, or the like as required. The thickness of the substrate sheet is preferably 20 to 100 μm, more preferably 30 to 90 μm, and most preferably 30 to 80 μm. The substrate sheet has a thickness within such a range, to thereby provide strength for favorably supporting a very thin second optical compensation layer in a transfer step (described below) and appropriately maintain operability such as sliding property or roll traveling property.

Next, an applied film of the solution of an optical compensation layer forming material formed on the substrate sheet is dried, to thereby form a polymer layer (this polymer layer eventually serves as the second optical compensation layer 14). A drying method may employ any appropriate method (such as natural drying, heat drying, or air drying). A drying temperature may vary depending on the kind of optical compensation layer forming material, the kind of solvent, optical properties of a target optical compensation layer, and the like. The drying temperature is preferably 20 to 400° C., more preferably 60 to 300° C., and most preferably 65 to 250° C. A drying time is preferably 0.5 to 200 minutes, more preferably 1 to 120 minutes, and most preferably 5 to 100 minutes. Drying may be conducted at a constant temperature, or may be conducted while the temperature is continuously or gradually changed.

Next, the obtained polymer layer is heated and stretched together with the substrate sheet (that is, the polymer layer and the substrate sheet are integrally heated and stretched), to thereby form the second optical compensation layer on the substrate sheet. A stretching method may employ any appropriate method (such as fixed-end stretching or free-end stretching). A stretch ratio is preferably 1.2 to 3.0 times, more preferably 1.3 to 2.9 times, and most preferably 1.3 to 2.8 times with respect to a length of the polymer layer and the substrate sheet integrated before stretching. The stretch ratio within such ranges can provide a desired Nz coefficient for the second optical compensation layer. A stretching temperature is preferably 120 to 200° C., more preferably 130 to 190° C., and most preferably 135 to 180° C. The stretching temperature is set within such ranges, and thus optical properties of the optical compensation layer to be obtained can stably be controlled even through stretching treatment at a very large stretch ratio.

A stretching direction may be set in accordance with a desired direction of the slow axis of the second optical compensation layer. In the present invention, the slow axis of the first optical compensation layer may be set in any oblique direction with respect to the absorption axis (longitudinal direction of continuous film) of the polarizer. In the case where the slow axis of the first optical compensation layer is set in a direction of +22° to +23° or −22° to −23° with respect to the absorption axis of the polarizer, the slow axis of the second optical compensation layer and the absorption axis of the polarizer may be arranged to be substantially perpendicular to each other. The direction of the slow axis corresponds to the stretching direction, and thus stretching of the polymer layer and the substrate sheet may be conducted in a transverse direction (width direction: direction perpendicular to the longitudinal direction: direction perpendicular to the absorption axis of the polarizer). Thus, punching out is not necessary for aligning the direction of the slow axis of the second optical compensation layer, and attachment by roll to roll is realized, to thereby further improve the production efficiency.

Next, the second optical compensation layer formed on the substrate sheet is transferred to the surface of the first optical compensation layer. A transfer method is not particularly limited, and is conducted by attaching the second optical compensation layer supported on the substrate sheet to the first optical compensation layer through an adhesive, for example. A typical example of the adhesive is a curable adhesive. Typical examples of the curable adhesive include: a photo-curable adhesive such as a UV-curable adhesive; a moisture-curable adhesive; and a heat-curable adhesive. A specific example of the heat-curable adhesive is a heat-curable resin-based adhesive formed of an epoxy resin, an isocyanate resin, a polyimide resin, or the like. A specific example of the moisture-curable adhesive is an isocyanate resin-based moisture-curable adhesive. The moisture-curable adhesive (in particular, an isocyanate resin-based moisture-curable adhesive) is preferred. The moisture-curable adhesive cures through a reaction with moisture in air, water adsorbed on a surface of an adherend, an active hydrogen group of a hydroxyl group, a carboxyl group, or the like, etc. Thus, the adhesive may be applied and then cured naturally by leaving at stand, and has excellent operability. Further, the moisture-curable adhesive requires no heating for curing, and thus the first and second optical compensation layers are not heated during lamination (bonding). As a result, no heat shrinkage occurs, and thus formation of cracks during lamination or the like may significantly be prevented even in the case where the first and second optical compensation layers each have a very small thickness as in the present invention. Note that the isocyanate resin-based adhesive is a general term for a polyisocyanate-based adhesive and a polyurethane resin adhesive.

For example, a commercially available adhesive may be used as the curable adhesive, or various curable resins may be dissolved or dispersed in a solvent to prepare a curable resin adhesive solution (or dispersion). In the case where the solution (or dispersion) is prepared, a ratio of the curable resin in the solution is preferably 10 to 80 wt %, more preferably 20 to 65 wt %, especially preferably 25 to 65 wt %, and most preferably 30 to 50 wt % in solid content. Any appropriate solvent may be used as the solvent to be used in accordance with the kind of curable resin, and specific examples thereof include ethyl acetate, methyl ethyl ketone, methyl isobutyl ketone, toluene, and xylene. One kind of solvent may be used alone, or two or more kinds thereof may be used in combination.

An application amount of the adhesive may appropriately be set in accordance with the purpose. For example, the application amount is preferably 0.3 to 3 ml, more preferably 0.5 to 2 ml, and most preferably 1 to 2 ml per area ($cm^2$) of the first or second optical compensation layer. After the application, the solvent in the adhesive is evaporated through natural drying or heat drying as required. A thickness of the adhesive layer to be obtained is preferably 0.1 µm to 20 µm, more preferably 0.5 µm to 15 µm, and most preferably 1 µm to 10 µm. An indentation curing degree (Microhardness) of the adhesive layer is preferably 0.1 to 0.5 GPa, more preferably 0.2 to 0.5 GPa, and most preferably 0.3 to 0.4 GPa. Correlation between Microhardness and Vickers hardness is known, and thus the Microhardness may be converted into Vickers hardness. The Microhardness may be calculated from indentation depth and indentation load by using a thin-film hardness meter (trade names, MH4000 and MHA-400, for example) manufactured by NEC Corporation.

Finally, the substrate sheet is peeled off from the second optical compensation layer, to thereby complete the lamination of the first optical compensation layer and the second optical compensation layer. In this way, the optical film of the present invention can be obtained.

B-6. Specific Production Procedure

An example of a specific procedure for the production method of the present invention will be described by referring to FIGS. 3 to 7. Note that in FIGS. 3 to 7, reference numerals 111, 111', 112, 112', 115, and 116 each are rolls for rolling films forming respective layers and/or a laminate.

First, a continuous polymer film serving as a raw material for a polarizer is prepared, and is subjected to coloring, stretching, and the like as described in the above section A-4. The continuous polymer film is subjected to continuous stretching in its longitudinal direction. In this way, as shown in a perspective view of FIG. 3, a continuous polarizer 11 having an absorption axis in a longitudinal direction (stretching direction: direction of arrow A) is obtained.

Figure 4A:
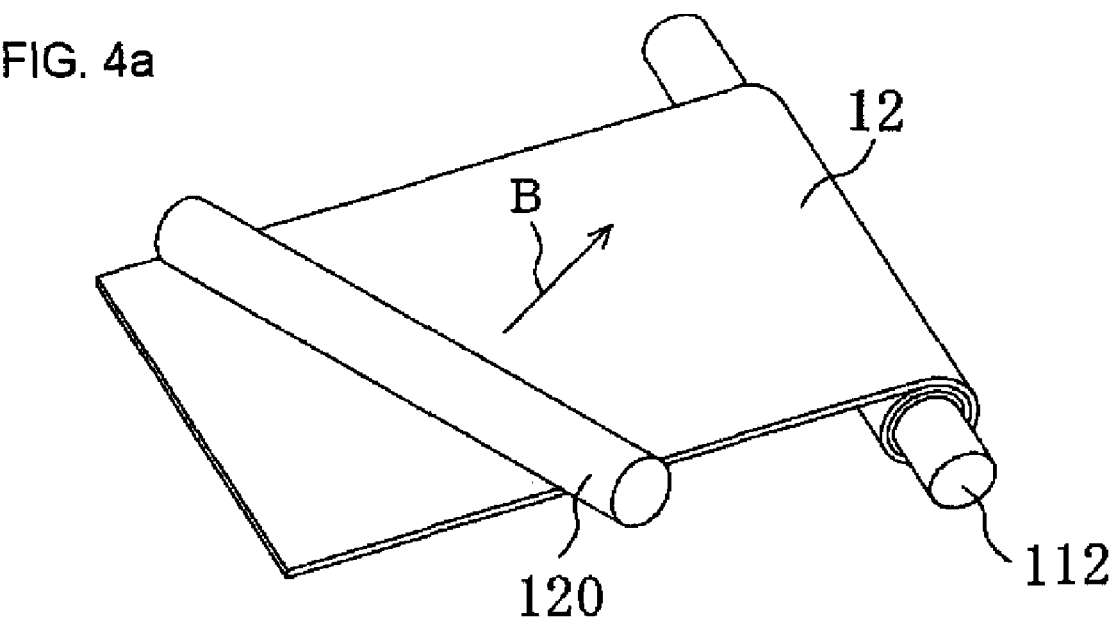
FIG. 4 Perspective views showing a process outline according to another example of the method of producing an optical film of the present invention.
Figure 4B:
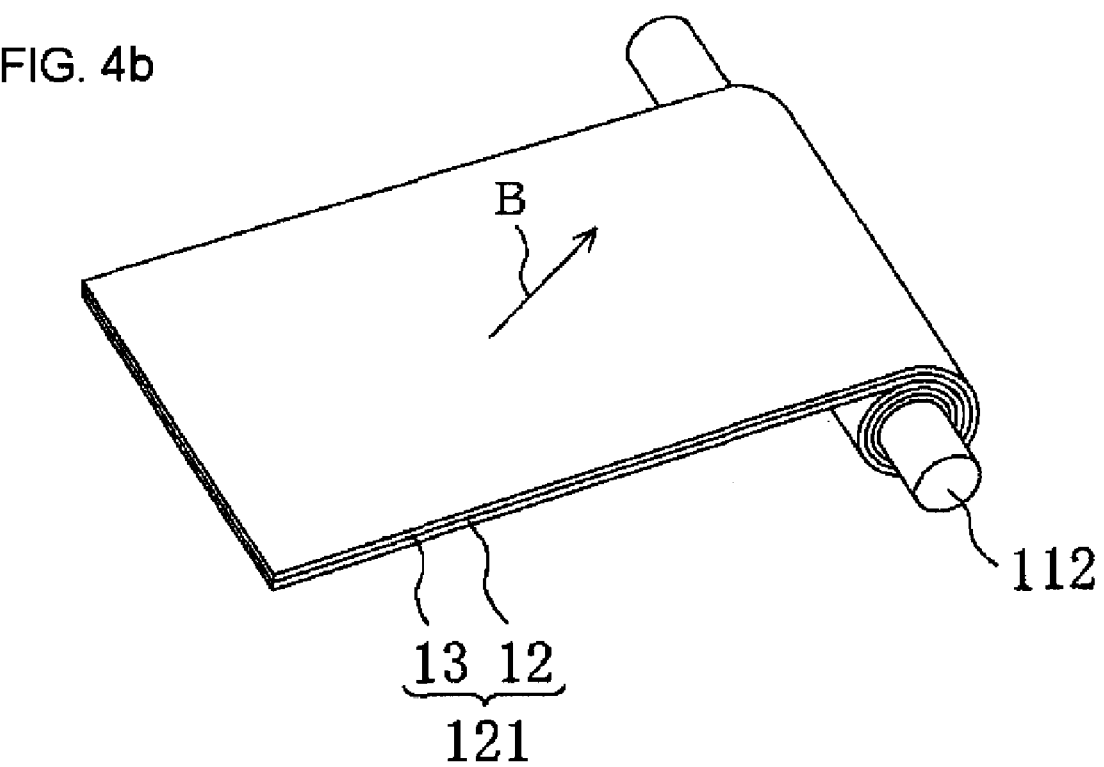

Meanwhile, as shown in a perspective view of FIG. 4(*a*), a continuous transparent protective film 12 (eventually serving as a protective layer) is prepared, and one surface thereof is subjected to rubbing treatment with a rubbing roll 120. A direction of the rubbing is in a direction different from a longitudinal direction of the transparent protective film 12 such as in a direction of ±22.5°. Next, as shown in a perspective view of FIG. 4(*b*), on the transparent protective film 12 subjected to the rubbing treatment, a first optical compensation layer 13 is formed as described in the above sections B-2 and B-3. In the first optical compensation layer 13, a liquid crystal material is aligned along the rubbing direction, and thus a slow axis direction is in a direction (direction of arrow B) substantially identical to the rubbing direction of the transparent protective film 12.

Figure 5:
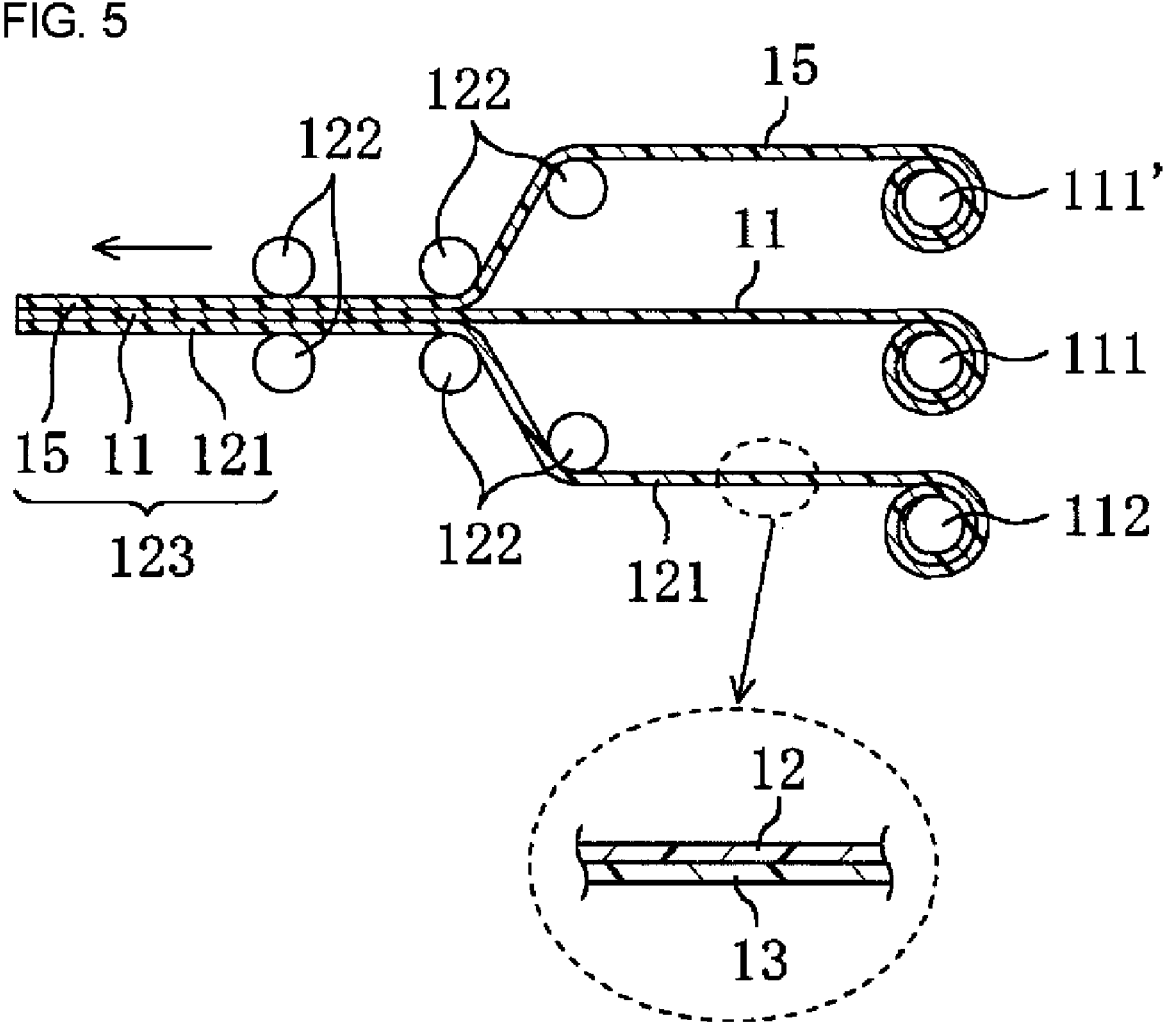
FIG. 5 Schematic diagrams showing a process outline according to still another example of the method of producing an optical film of the present invention.

Next, as shown in a schematic diagram of FIG. 5, a continuous second transparent protective film (second protective layer) 15, the continuous polarizer 11, and a laminate 121 of the transparent protective film (protective layer) 12 and the first optical compensation layer 13 are delivered in a direction of the arrow, and are attached together with respective longitudinal directions aligned by using an adhesive or the like (not shown). In this way, a laminate 123 (including the second protective layer 15, the polarizer 11, the protective layer 12, and the first optical compensation layer 13) is obtained. Note that in FIG. 5, reference numeral 122 represents a guide roll for attaching the films together (the same applies for FIGS. 6 and 7).

Further, as shown in a schematic diagram of FIG. 6(a), a continuous laminate 125 (including the second optical compensation layer 14 supported on a substrate sheet 26) is prepared, and the laminate 125 and the laminate 123 (including the second protective layer 15, the polarizer 11, the protective layer 12, and the first optical compensation layer 13) are delivered in the direction of the arrow, and are attached together with respective longitudinal directions aligned by using an adhesive or the like (not shown). In this way, in the present invention, very thin first and second optical compensation layers can be attached by so-called roll to roll, and the production efficiency may remarkably improve.

Finally, as shown in FIG. 6(b), a substrate sheet 26 is peeled off, to thereby obtain the optical film 10 of the present invention.

Another example of the specific procedure for the production method of the present invention will be described.

In the same manner as described above, as shown in the perspective view of FIG. 3, the continuous polarizer 11 is prepared.

Meanwhile, as shown in the perspective view of FIG. 4(a), the continuous transparent protective film (eventually serving as a protective layer) 12 is prepared, and one surface thereof is subjected to rubbing treatment with the rubbing roll 120. The direction of the rubbing is in a direction at a predetermined angle with respect to the longitudinal direction of the transparent protective film 12 such as in a direction of ±22.5°.

Figure 7:
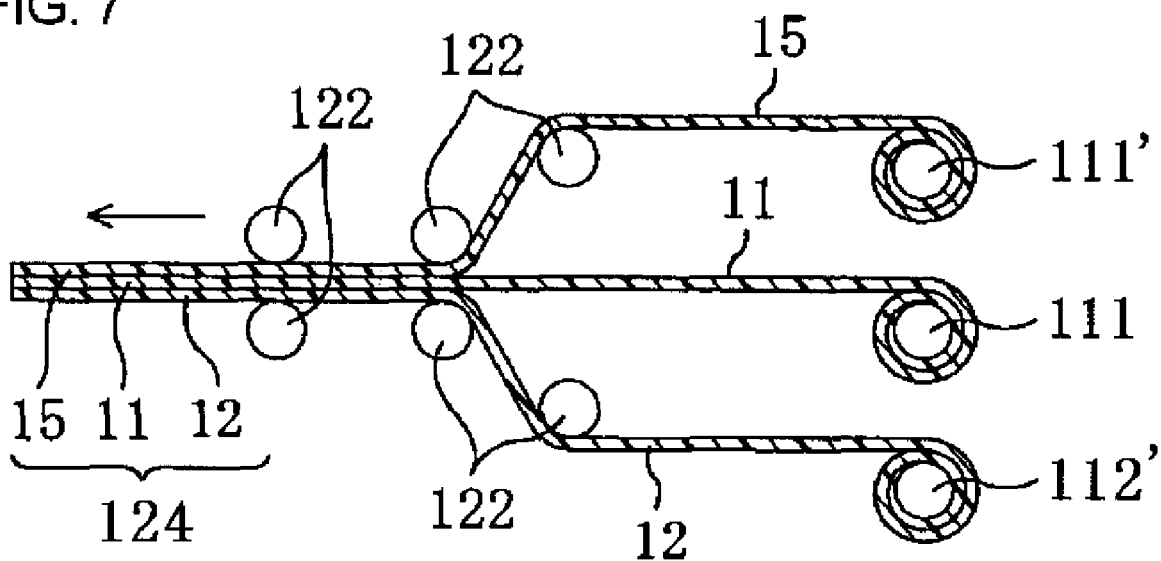
FIG. 7 A schematic diagram showing a process outline according to still another example of the method of producing an optical film of the present invention.

Next, as shown in the schematic diagram of FIG. 7, the continuous second transparent protective film (second protective layer) 15, the continuous polarizer 11, and the continuous transparent protective film (protective layer) 12 are delivered in a direction of the arrow, and are attached together with respective longitudinal directions aligned by using an adhesive or the like (not shown). At this time, the transparent protective film 12 subjected to the rubbing treatment is delivered such that a surface opposite to the surface subjected to the rubbing treatment opposes the polarizer 11. As a result, a laminate 124 of second protective layer (second transparent protective film) 15/polarizer 11/protective layer (transparent protective film) 12 is obtained.

Next, on the protective layer (transparent protective film 12) subjected to the rubbing treatment, the first optical compensation layer 13 is formed as described in the above sections B-2 and B-3. In the first optical compensation layer 13, a liquid crystal material is aligned along the rubbing direction, and thus a slow axis direction is in a direction (direction of arrow B) substantially identical to the rubbing direction of the transparent protective film 12. In this way, the laminate 123 (including the second protective layer 15, the polarizer 11, the protective layer 12, and the first optical compensation layer 13) is obtained.

Next, as shown in the schematic diagram of FIG. 6(a), the continuous laminate 125 (including the second optical compensation layer 14 supported on the substrate sheet 26) is prepared, and the laminate 125 and the laminate 123 (including the second protective layer 15, the polarizer 11, the protective layer 12, and the first optical compensation layer 13) are delivered in the direction of the arrow, and are attached together with respective longitudinal directions aligned by using an adhesive or the like (not shown). Finally, as shown in FIG. 6(b), the substrate sheet 26 is peeled off, to thereby obtain the optical film 10 of the present invention.

Still another example of the specific procedure for the production method of the present invention will be described.

In the same manner as described above, as shown in the perspective view of FIG. 3, the continuous polarizer 11 is produced.

Next, as shown in the schematic diagram of FIG. 7, the continuous second transparent protective film (second protective layer) 15, the continuous polarizer 11, and the continuous transparent protective film (protective layer) 12 are delivered in a direction of the arrow, and are attached together with respective longitudinal directions aligned by using an adhesive or the like (not shown). As a result, the laminate 124 of second protective layer (second transparent protective film) 15/polarizer 11/protective layer (transparent protective film) 12 is obtained.

Next, a surface of the protective layer (transparent protective film) 12 on an opposite side of the polarizer 11 is subjected to rubbing treatment with the rubbing roll 120. The direction of the rubbing is in a direction at a predetermined angle with respect to the longitudinal direction of the transparent protective film 12 such as in a direction of ±22.5°.

Next, on the protective layer (transparent protective film) 12 subjected to the rubbing treatment, the first optical compensation layer 13 is formed as described in the above sections B-2 and B-3. In the first optical compensation layer 13, a liquid crystal material is aligned along the rubbing direction, and thus a slow axis direction is in a direction (direction of arrow B) substantially identical to the rubbing direction of the transparent protective film 12. In this way, the laminate 123 (including the second protective layer 15, the polarizer 11, the protective layer 12, and the first optical compensation layer 13) is obtained.

Next, as shown in the schematic diagram of FIG. 6(a), the continuous laminate 125 (including the second optical compensation layer 14 supported on the substrate sheet 26) is prepared, and the laminate 125 and the laminate 123 (including the second protective layer 15, the polarizer 11, the protective layer 12, and the first optical compensation layer 13) are delivered in the direction of the arrow, and are attached together with respective longitudinal directions aligned by using an adhesive or the like (not shown). Finally, as shown in FIG. 6(b), the substrate sheet 26 is peeled off, to thereby obtain the optical film 10 of the present invention.

C. Applications of Optical Film

The optical film of the present invention may suitably be used for various image display apparatuses (such as a liquid crystal display apparatus and a self-luminous display apparatus). Specific examples of applicable image display apparatuses include a liquid crystal display apparatus, an EL display, a plasma display (PD), and a field emission display (FED). In the case where the optical film of the present invention is used for a liquid crystal display apparatus, the optical film is useful for prevention of light leak in black display and for compensation of viewing angle. The optical film of the present invention is preferably used for a liquid crystal display apparatus of VA mode, and is particularly preferably used for a reflective or semi-transmissive liquid crystal display apparatus of VA mode. In the case where the optical film of the present invention is used for an EL display, the optical film is useful for prevention of electrode reflection.

D. Image Display Apparatus

Figure 8:
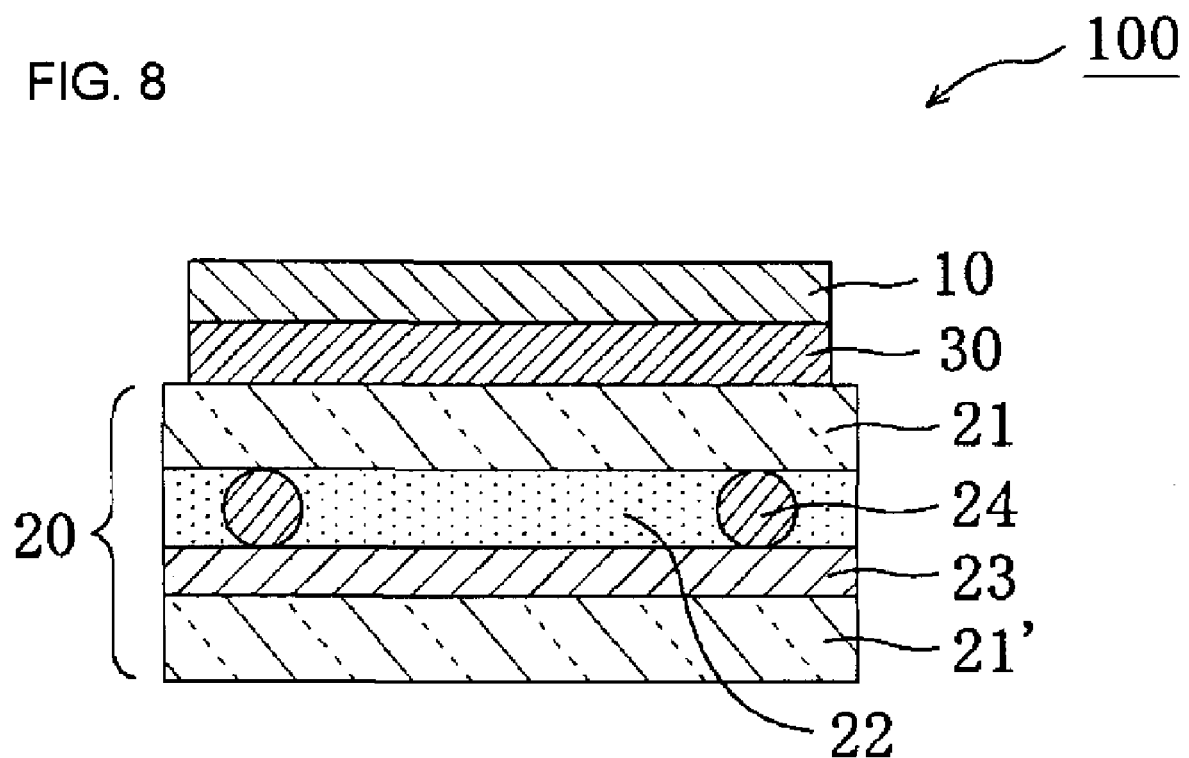
FIG. 8 A schematic sectional view of a liquid crystal panel to be used in a liquid crystal display apparatus according to a preferred embodiment of the present invention.

A liquid crystal display apparatus is described as an example of the image display apparatus of the present invention. A liquid crystal panel to be used for the liquid crystal display apparatus is described. Other structure of the liquid crystal display apparatus may employ any appropriate structure in accordance with the purpose. In the present invention, a liquid crystal display apparatus of VA mode is preferred, and a liquid crystal display apparatus of reflective or semi-transmissive VA mode is particularly preferred. FIG. 8 is a schematic sectional view of a liquid crystal panel according to a preferred embodiment of the present invention. A liquid crystal panel for a reflective liquid crystal display apparatus is described. A liquid crystal panel 100 is provided with: a liquid crystal cell 20; a retardation plate 30 arranged on an upper side of the liquid crystal cell 20; and a polarizing plate 10 arranged on an upper side of the retardation plate 30. The optical film of the present invention described in the above sections A and B is appropriately used as the polarizing plate 10. The retardation plate 30 may employ any appropriate retardation plate in accordance with the purpose and the alignment mode of the liquid crystal cell. The retardation plate 30 may be omitted in accordance with the purpose and the alignment mode of the liquid crystal cell. In case the optical film of the present invention is used as the polarizing plate 10, the retardation plate 30 may be omitted because of an excellent optical compensation by only the polarizing plate 10. The liquid crystal cell 20 includes: a pair of glass substrates 21 and 21'; and a liquid crystal layer 22 as a display medium arranged between the substrates. A reflecting electrode 23 is provided on a liquid crystal layer 22 side of the lower substrate 211, and color filters (not shown) are provided on the upper substrate 21. A distance (cell gap) between the substrates 21 and 21' is controlled by a spacer 24.

In the liquid crystal display apparatus 100 of reflective VA mode, for example, liquid crystal molecules are aligned vertically to surfaces of the substrates 21 and 21' under no voltage application. Such vertical alignment may be realized by arranging nematic liquid crystals having negative dielectric anisotropy between substrates each having formed thereon a vertically alignment film (not shown). Linear polarized light allowed to pass through the polarizing plate 10 from a surface of the upper substrate 21 entering the liquid crystal layer 22 in such a state advances along long axes of vertically aligned liquid crystal molecules. No birefringence generates in a long axis direction of the liquid crystal molecules such that incident light advances without changing a polarization direction. The light is reflected by the reflecting electrode 23, and then is allowed to pass through the liquid crystal cell 22, and exits from the upper substrate 21. A polarization state of the exiting light is the same as that of the incident light, and the exiting light is allowed to pass through the polarizing plate 10, to thereby provide light display. Long axes of the liquid crystal molecules align parallel to the surfaces of the substrates under voltage application between electrodes. The liquid crystal molecules exhibit birefringence with respect to linear polarized light entering the liquid crystal layer 22 in such a state, and the polarization state of incident light varies depending on inclination of the liquid crystal molecules. Light reflected by the reflecting electrode 23 and exiting from the upper substrate under application of a predetermined maximum voltage rotates its polarization direction by 90° into linear polarized light, for example, and is absorbed by the polarizing plate 10, to thereby provide dark display. Return to a state under no voltage application provides light display again by alignment control force. The inclination of the liquid crystal molecules may be controlled by varying an application voltage to change an intensity of transmitted light from the polarizing plate 10, to thereby provide gradation display.

Hereinafter, the present invention will be more specifically described by examples. However, the present invention is not limited to the examples. Methods of measuring characteristics in the examples are as described below.

(1) Measurement of Retardation

Refractive indices nx, ny, and nz of a sample film were measured with an automatic birefringence analyzer (Automatic birefringence analyzer KOBRA-31PR manufactured by Oji Scientific Instruments), and an in-plane retardation Re and a thickness retardation Rth were calculated. A measurement temperature was 23° C., and a measurement wavelength was 590 nm.

(2) Measurement of Thickness

The thickness of the first optical compensation layer was measured through interference thickness measurement by using MCPD-2000, manufactured by Otsuka Electronics Co., Ltd. The thickness of each of other various films was measured with a dial gauge.

Example 1 a. Production of Alignment Substrate (A-1)

A TAC film (thickness of 40 μm) was subjected to rubbing at a rubbing angle of 22.5° by using a rubbing cloth, to thereby produce an alignment substrate (A-1).

b. Production of Laminate (X1) Formed of First Optical Compensation Layer (B-1)/Alignment Substrate (A-1)

10 g of polymerizable liquid crystals exhibiting a nematic liquid crystal phase: "Paliocolor LC242" (trade name, available from BASF Aktiengesellschaft) and 0.5 g of a photopolymerization initiator: "IRGACURE 907T" (trade name, Ciba Specialty Chemicals) were dissolved in 40 g of toluene, to thereby prepare a liquid crystal composition (application liquid). The application liquid was applied onto the alignment substrate (A-1) produced as described above by using a bar coater. The resultant was dried under heating at 90° C. for 2 minutes, to thereby align the liquid crystals. Next, the thus-formed liquid crystal layer was irradiated with light at 20 mJ/cm² by using a metal halide lamp and was cured, to thereby form a first optical compensation layer (B-1) which is a positive uniaxial film having a refractive index profile of nx>ny=nz. The thickness and retardation of the first optical compensation layer (B-1) were adjusted by changing an application amount of the application liquid. The first optical compensation layer (B-1) had a thickness of 2.2 μm and a retardation of 250 nm.

c. Production of Laminate (Y1) Formed of First Optical Compensation Layer (B-1)/Alignment Substrate (A-1)/Polarizer/TAC A polyvinyl alcohol film was colored in an aqueous solution containing iodine and then uniaxially stretched 6 times between rolls of different speed ratios in an aqueous solution containing boric acid, to thereby obtain a polarizer. The obtained polarizer, a TAC film (thickness of 40 μm), and the laminate (X1) formed of the alignment substrate (A-1) and the first optical compensation layer (B-1) were laminated (such that an absorption axis direction of the polarizer was in a longitudinal direction and an angle formed between the absorption axis of the polarizer and a slow axis of the first optical compensation layer (B-1) was 22.5° and −22.5°) by using an adhesive through a production procedures shown in FIG. 5, to thereby obtain a laminate (Y1) formed of first optical compensation layer (B-1)/alignment substrate (A-1)/ polarizer/TAC. Note that, the laminate (Y1) as used herein is a general term including both a laminate in which an angle formed between the absorption axis of the polarizer and the slow axis of the first optical compensation layer (B-1) was 22.5° and a laminate in which an angle formed between the absorption axis of the polarizer and the slow axis of the first optical compensation layer (B-1) was −22.5°.

d. Production of Laminate (Z1) Formed of Second Optical Compensation Layer (C-1)/Zeonor A solution containing 15 wt % of polyimide synthesized from 2,2'-bis(3,4-dicarboxyphenyl)hexafluoropropane and 2,2'-bis(trifluoromethyl)-4,4'-diaminobiphenyl by using cyclohexanone as a solvent was applied to "Zeonor" (trade name, available from Zeon Corporation, thickness before stretching of 100 μm) at a thickness of 25 μm, and the whole was subjected to drying treatment at 120° C. for 5 minutes. The obtained film was stretched 1.4 times in a width direction through free-end uniaxial stretching at 140° C. In this way, a laminate (Z1) formed of a second optical compensation layer (C-1)/Zeonor was produced.

Retardations of the polyimide layer (second optical compensation layer (C-1) alone were measured by using "KOBRA21-ADH" (trade name, manufactured by Oji Scientific Instruments). As a result, the polyimide layer satisfied a relationship of nx>ny>nz and had an in-plane retardation Re of 130 nm, a thickness direction retardation Rth of 182 nm, and an Nz coefficient (Nz=(nx−nz)/(nx−ny)) of 1.4.

e. Production of Optical Film

The laminate (Y1) formed of first optical compensation layer (B-1)/alignment substrate (A-1)/polarizer/TAC, and the laminate (Z1) formed of second optical compensation layer (C-1)/Zeonor were laminated (such that the absorption axis direction of the polarizer was in a longitudinal direction, and an angle formed between the absorption axis of the polarizer and a slow axis of the second optical compensation layer (C-1) was 90°) through a urethane-based adhesive (thickness: 5 mm) through a production procedure shown in FIG. 6(a), and "Zeonor" was peeled off finally through a production procedure shown in FIG. 6(b), to thereby obtain an optical film (1) formed of second optical compensation layer (C-1)/ first optical compensation layer (B-1)/alignment substrate (A-1)/polarizer/TAC. Further, a pressure-sensitive adhesive having a thickness of 20 μm was attached onto the second optical compensation layer for formation of a pressure-sensitive adhesive layer, to thereby produce an optical film (1A).

Example 2

An alignment substrate (A-2) was produced in the same manner as in the section "a. Production of alignment substrate (A-1)". A laminate (X2) formed of first optical compensation layer (B-2)/alignment substrate (A-2) was produced in the same manner as in the section "b. Production of laminate (X1) formed of first optical compensation layer (B-1)/alignment substrate (A-1)". A laminate (Y2) formed of first optical compensation layer (B-2)/TAC/polarizer/TAC was produced in the same manner as in the section "c. Production of laminate (Y1) formed of first optical compensation layer (B-1)/ TAC/polarizer/TAC".

d. Production of Laminate (Z2) Formed of Second Optical Compensation Layer (C-2)/Zeonor A solution containing 10 wt % of polyimide synthesized from 2,2'-bis(3,4-dicarboxyphenyl)hexafluoropropane and 2,2'-bis(trifluoromethyl)-4,4'-diaminobiphenyl by using cyclohexanone as a solvent was applied to "Zeonor" (trade name, available from Zeon Corporation, thickness before stretching of 100 μm) at a thickness of 30 μm, and the whole was subjected to drying treatment at 120° C. for 5 minutes. A thickness of this polyimide thin film was measured by a light interference method and was 2.9 μm. The obtained film was stretched 1.73 times in a width direction through fixed-end uniaxial stretching at 150° C. In this way, a laminate (Z2) formed of second optical compensation layer (C-2)/Zeonor was produced.

Retardations of the polyimide layer (second optical compensation layer (C-2) alone were measured by using "KOBRA21-ADH" (trade name, manufactured by Oji Scientific Instruments). As a result, the polyimide layer satisfied a relationship of nx>ny>nz and had an in-plane retardation Re of 121 nm, a thickness direction retardation Rth of 197 nm, and an nz coefficient (Nz=(nx−nz)/(nx−ny)) of 1.63.

e. Production of Optical Film

The laminate (Y2) and the laminate (Z2) were laminated in the same manner as in Example 1, and "Zeonor" was peeled off, to thereby obtain an optical film (2) formed of second optical compensation layer (C-2)/first optical compensation layer (B-2)/TAC/polarizer/TAC. Further, a pressure-sensitive adhesive having a thickness of 20 μm was attached onto the second optical compensation layer for formation of a pressure-sensitive adhesive layer, to thereby produce an optical film (2A).

Example 3

An alignment substrate (A-3) was produced in the same manner as in the section "a. Production of alignment substrate (A-1)". A laminate (X3) formed of first optical compensation layer (B-3)/alignment substrate (A-3) was produced in the same manner as in the section "b. Production of laminate (X1) formed of first optical compensation layer (B-1)/alignment substrate (A-1)". A laminate (Y3) formed of first optical compensation layer (B-3)/TAC/polarizer/TAC was produced in the same manner as in the section "c. Production of laminate (Y1) formed of first optical compensation layer (B-1)/ TAC/polarizer/TAC".

d. Production of Laminate (Z3) Formed of Second Optical Compensation Layer (C-3)/Zeonor A solution containing 15 wt % of polyimide synthesized from 2,2'-bis(3,4-dicarboxyphenyl)hexafluoropropane and 2,2'-bis(trifluoromethyl)-4,4'-diaminobiphenyl by using cyclohexanone as a solvent was applied to "Zeonor" (trade name, available from Zeon Corporation, thickness before stretching of 100 μm) at a thickness of 31 μm, and the whole was subjected to drying treatment at 120° C. for 5 minutes. A thickness of this polyimide thin film was measured by a light interference method and was 3.1 μm. The obtained film was stretched 1.55 times in a width direction through fixed-end uniaxial stretching at 150° C. In this way, a laminate (Z3) formed of second optical compensation layer (C-3)/Zeonor was produced.

Retardations of the polyimide layer (second optical compensation layer (C-3)) alone were measured by using "KOBRA21-ADH" (trade name, manufactured by Oji Scientific Instruments). As a result, the polyimide layer satisfied a relationship of nx>ny>nz and had an in-plane retardation Re of 122 nm, a thickness direction retardation Rth of 205 nm, and an Nz coefficient (Nz (nx−nz)/(nx−ny)) of 1.68.

e. Production of Optical Film

The laminate (Y3) and the laminate (Z3) were laminated in the same manner as in Example 1, and "Zeonor" was peeled off, to thereby obtain an optical film (3) formed of second optical compensation layer (C-3)/first optical compensation layer (B-3)/TAC/polarizer/TAC. Further, a pressure-sensitive adhesive having a thickness of 20 μm was attached onto the second optical compensation layer for formation of a pressure-sensitive adhesive layer, to thereby produce an optical film (3A).

Example 4

An alignment substrate (A-4) was produced in the same manner as in the section "a. Production of alignment substrate (A-1)". A laminate (X4) formed of first optical compensation layer (B-4)/alignment substrate (A-4) was produced in the same manner as in the section "b. Production of laminate (X1) formed of first optical compensation layer (B-1)/alignment substrate (A-1)". A laminate (Y4) formed of first optical compensation layer (B-4)/TAC/polarizer/TAC was produced in the same manner as in the section "c. Production of laminate (Y1) formed of first optical compensation layer (B-1)/TAC/polarizer/TAC".

d. Production of Laminate (Z4) Formed of Second Optical Compensation Layer (C-4)/Zeonor A solution containing 15 wt % of polyimide synthesized from 2,2'-bis(3,4-dicarboxyphenyl)hexafluoropropane and 2,2'-bis(trifluoromethyl)-4,4'-diaminobiphenyl by using cyclohexanone as a solvent was applied to "Zeonor" (trade name, available from Zeon Corporation, thickness before stretching of 100 μm) at a thickness of 33 μm, and the whole was subjected to drying treatment at 120° C. for 5 minutes. A thickness of this polyimide thin film was measured by a light interference method and was 3.3 μm. The obtained film was stretched 1.46 times in a width direction through fixed-end uniaxial stretching at 150° C. In this way, a laminate (Z4) formed of second optical compensation layer (C-4)/Zeonor was produced.

Retardations of the polyimide layer (second optical compensation layer (C-4)) alone were measured by using "KOBRA21-ADH" (trade name, manufactured by Oji Scientific Instruments). As a result, the polyimide layer satisfied a relationship of nx>ny>nz and had an in-plane retardation Re of 119 nm, a thickness direction retardation Rth of 376 nm, and an Nz coefficient (Nz=(nx−nz)/(nx−ny)) of 1.89.

e. Production of Optical Film

The laminate (Y4) and the laminate (Z4) were laminated in the same manner as in Example 1, and "Zeonor" was peeled off, to thereby obtain an optical film (4) formed of second optical compensation layer (C-4)/first optical compensation layer (B-4)/TAC/polarizer/TAC. Further, a pressure-sensitive adhesive having a thickness of 20 μm was attached onto the second optical compensation layer for formation of a pressure-sensitive adhesive layer, to thereby produce an optical film (4A).

Example 5

An alignment substrate (A-5) was produced in the same manner as in the section "a. Production of alignment substrate (A-1)". A laminate (X5) formed of first optical compensation layer (B-5)/alignment substrate (A-5) was produced in the same manner as in the section "b. Production of laminate (X1) formed of first optical compensation layer (B-1)/alignment substrate (A-1)". A laminate (Y5) formed of first optical compensation layer (B-5)/TAC/polarizer/TAC was produced in the same manner as in the section "c. Production of laminate (Y1) formed of first optical compensation layer (B-1)/TAC/polarizer/TAC".

d. Production of Laminate (Z5) Formed of Second Optical Compensation Layer (C-5)/Zeonor A solution containing 15 wt % of polyimide synthesized from 2,2'-bis(3,4-dicarboxyphenyl)hexafluoropropane and 2,2'-bis(trifluoromethyl)-4,4'-diaminobiphenyl by using cyclohexanone as a solvent was applied to "Zeonor" (trade name, available from Zeon Corporation, thickness before stretching of 100 μm) at a thickness of 19 μm, and the whole was subjected to drying treatment at 120° C. for 5 minutes. The obtained film was stretched 1.85 times in a width direction through free-end uniaxial stretching at 150° C. In this way, a laminate (Z5) formed of second optical compensation layer (C-5)/Zeonor was produced.

Retardations of the polyimide layer (second optical compensation layer (C-5)) alone were measured by using "KOBRA21-ADH" (trade name, manufactured by Oji Scientific Instruments). As a result, the polyimide layer satisfied a relationship of nx>ny>nz and had an in-plane retardation Re of 122 nm, a thickness direction retardation Rth of 142 nm, and an Nz coefficient (Nz=(nx−nz)/(nx−ny)) of 1.16.

e. Production of Optical Film

The laminate (Y5) and the laminate (Z5) were laminated in the same manner as in Example 1, and "Zeonor" was peeled off, to thereby obtain an optical film (5) formed of second optical compensation layer (C-5)/first optical compensation layer (B-5)/TAC/polarizer/TAC. Further, a pressure-sensitive adhesive having a thickness of 20 μm was attached onto the second optical compensation layer for formation of a pressure-sensitive adhesive layer, to thereby produce an optical film (5A).

Example 6

An alignment substrate (A-6) was produced in the same manner as in the section "a. Production of alignment substrate (A-1)". A laminate (X6) formed of first optical compensation layer (B-6)/alignment substrate (A-6) was produced in the same manner as in the section "b. Production of laminate (X1) formed of first optical compensation layer (B-1)/alignment substrate (A-1)". A laminate (Y6) formed of first optical compensation layer (B-6)/TAC/polarizer/TAC was produced in the same manner as in the section "c. Production of laminate (Y1) formed of first optical compensation layer (B-1)/TAC/polarizer/TAC".

d. Production of Laminate (Z6) Formed of Second Optical Compensation Layer (C-6)/Zeonor A solution containing 15 wt % of polyimide synthesized from 2,2'-bis(3,4-dicarboxyphenyl)hexafluoropropane and 2,2'-bis(trifluoromethyl)-4,4'-diaminobiphenyl by using cyclohexanone as a solvent was applied to "Zeonor" (trade name, available from Zeon Corporation, thickness before stretching of 100 μm) at a thickness of 36 μm, and the whole was subjected to drying treatment at 120° C. for 5 minutes. The obtained film was stretched 1.38 times in a width direction through fixed-end uniaxial stretching at 150° C. In this way, a laminate (Z6) formed of second optical compensation layer (C-6)/Zeonor was produced.

Retardations of the polyimide layer (second optical compensation layer (C-6)) alone were measured by using "KOBRA21-ADH" (trade name, manufactured by Oji Scientific Instruments). As a result, the polyimide layer satisfied a relationship of nx>ny>nz and had an in-plane retardation Re of 124 nm, a thickness direction retardation Rth of 261 nm, and an Nz coefficient (Nz (nx−nz)/(nx−ny)) of 2.1.

e. Production of Optical Film

The laminate (Y6) and the laminate (Z6) were laminated in the same manner as in Example 1, and "Zeonor" was peeled off, to thereby obtain an optical film (6) formed of second optical compensation layer (C-6)/first optical compensation layer (B-6)/TAC/polarizer/TAC. Further, a pressure-sensitive adhesive having a thickness of 20 μm was attached onto the second optical compensation layer for formation of a pressure-sensitive adhesive layer, to thereby produce an optical film (6A).

Example 7

An optical film (7) and an optical film (7A) including a pressure-sensitive adhesive layer attached were produced in the same manner as in Example 1 except that in Example 1: a uniaxially stretched film of "Zeonor" was used as a first optical compensation layer (B-7) instead of the first optical compensation layer (B-1); a biaxially stretched film of "Zeonor" was used as a second optical compensation layer (C-7) instead of the second optical compensation layer (C-1); and a pressure-sensitive adhesive having a thickness of 12 μm was used for attaching the first optical compensation layer, the second optical compensation layer, and a polarizing plate (TAC/polarizer/TAC).

The first optical compensation layer (B-7) had an in-plane retardation Re of 232 nm and an Nz coefficient (Nz=(nx−nz)/(nx−ny)) of 1.01.

The second optical compensation layer (C-7) had an in-plane retardation Re of 119 nm and an Nz coefficient (Nz (nx−nz)/(nx−ny)) of 1.6.

Example 8

An optical film (8) and an optical film (8A) including a pressure-sensitive adhesive layer attached were produced in the same manner as in Example 1 except that in Example 1: a biaxially stretched film of "Zeonor" was used as a second optical compensation layer (C-8) instead of the second optical compensation layer (C-1); and a pressure-sensitive adhesive having a thickness of 12 μm was used for attaching the first optical compensation layer, the second optical compensation layer, and a polarizing plate (TAC/polarizer/TAC).

The second optical compensation layer (C-8) had an in-plane retardation Re of 119 nm and an Nz coefficient (Nz (nx−nz)/(nx−ny)) of 1.6.

Example 9

An optical film (9) and an optical film (9A) including a pressure-sensitive adhesive layer attached were produced in the same manner as in Example 1 except that in Example 1: a biaxially stretched film of polycarbonate was used as a second optical compensation layer (C-9) instead of the second optical compensation layer (C-1) and a pressure-sensitive adhesive having a thickness of 12 μm was used for attaching the first optical compensation layer, the second optical compensation layer, and a polarizing plate (TAC/polarizer/TAC).

The second optical compensation layer (C-9) had an in-plane retardation Re of 122 nm and an Nz coefficient (Nz= (nx−nz)/(nx−ny)) of 1.6.

[Evaluation Test 1]

The thickness of the optical film obtained in each of Examples was measured. A digital micrometer was used for the measurement, and an average of n=5 was used as a measured value. Table 1 shows the results.

TABLE 1

|  | Optical film | Thickness of optical film (μm) |
|---|---|---|
| Example 1 | (1) | 110 |
| Example 2 | (2) | 109 |
| Example 3 | (3) | 112 |
| Example 4 | (4) | 107 |
| Example 5 | (5) | 108 |
| Example 6 | (6) | 114 |
| Example 7 | (7) | 212 |
| Example 8 | (8) | 168 |
| Example 9 | (9) | 161 |

Table 1 reveals that the optical films of Example 1 to 6 were capable of attaining further thickness reduction compared with the optical films of Examples 7 to 9.

[Evaluation Test 2]

The optical film obtained in each of Examples was installed in VA-LCD, and a contrast ratio was measured.

More specifically, the optical film in which an angle formed between the slow axis of the first optical compensation layer and the absorption axis of the polarizer was +22.5° was used as an upper plate and was attached to commercially available VA-LCD through a pressure-sensitive adhesive. Next, the optical film in which an angle formed between the slow axis of the first optical compensation layer and the absorption axis of the polarizer was −22.5° was used as a lower plate and was attached to commercially available VA-LCD through a pressure-sensitive adhesive such that an angle formed between the absorption axis of the polarizer in the optical film as an upper plate and the absorption axis of the polarizer in the optical film as a lower plate was 90°.

The brightness and chromaticity of the obtained LCD panel was measured by activating liquid crystals by using a brightness meter BM-5A manufactured by Topcon Corporation. The LCD panel provided black and white displays, and the brightness of a center part from a front direction was measured, and a front contrast ratio was calculated. Further, contrast ratios from directions at 60° from above, below, right, and left of the LCD panel were calculated.

Table 2 shows the results.

TABLE 2

|  | Contrast ratio | | | | |
|---|---|---|---|---|---|
|  | Front | 60° from above | 60° from below | 60° from right | 60° from left |
| Example 1 | 355 | 163 | 152 | 161 | 157 |
| Example 2 | 367 | 172 | 174 | 180 | 181 |
| Example 3 | 347 | 168 | 162 | 169 | 171 |
| Example 4 | 358 | 163 | 157 | 162 | 154 |
| Example 5 | 351 | 99 | 102 | 106 | 102 |
| Example 6 | 345 | 121 | 126 | 130 | 125 |

TABLE 2-continued

| | Contrast ratio | | | | |
| --- | --- | --- | --- | --- | --- |
| | Front | 60° from above | 60° from below | 60° from right | 60° from left |
| Example 7 | 441 | 194 | 181 | 198 | 192 |
| Example 8 | 245 | 97 | 95 | 102 | 96 |
| Example 9 | 375 | 175 | 177 | 182 | 188 |

Table 2 reveals that the front contrast ratio in Example 8 was lower compared with those of other examples (the front contrast ratios in examples excluding Example 8 realized 30 or more). Further, in Example 8, the black display was colored blue (no coloring was observed in examples excluding Example 8).

Further, Table 2 reveals that reduction of the contrast ratios in oblique directions (60° from above, below, right, and left) with respect to the front contrast ratio of Examples 1 to 6 was smaller compared with that of Examples 7 to 9.

[Evaluation Test 3]

The LCD panel produced in Evaluation Test 2 was charged into an oven at 70° C. for 15 minutes and was taken out in a state under no voltage application, that is, in a black state. Then, the LCD panel was immediately placed on a light box, to thereby measure the brightness. Table 3 shows the results.

TABLE 3

| | Brightness (cd/m$^2$) |
| --- | --- |
| Example 1 | 1.7 |
| Example 2 | 1.9 |
| Example 3 | 1.6 |
| Example 4 | 1.7 |
| Example 5 | 2.2 |
| Example 6 | 1.8 |
| Example 7 | 1.2 |
| Example 8 | 2.2 |
| Example 9 | 5.8 |

Table 3 reveals that a high temperature transmittance of black display in Example 9 was about 3 times that in other examples, and that Example 9 had significant light leak at high temperature. That is, Table 3 reveals that Example 9 involved significant uneven heating.

INDUSTRIAL APPLICABILITY

The optical film of the present invention may suitably be used for various image display apparatuses (such as a liquid crystal display apparatus and a self-luminous display apparatus).

The invention claimed is:

1. An optical film for VA mode, comprising:
a polarizer;
a first optical compensation layer having a refractive index profile of nx>ny=nz; and
a second optical compensation layer having a refractive index profile of nx>ny>nz in the stated order, wherein:
the first optical compensation layer comprises a λ/2 plate;
the second optical compensation layer consists of a λ/4 plate;
the second optical compensation layer is formed of at least one polymer selected from the group consisting of polyimide, polyamide, polyetherketone, polyamideimide, and polyesterimide;
an angle formed between an absorption axis of the polarizer and a slow axis of the first optical compensation layer is +17° to +27° or −17° to −27°;
an angle formed between the absorption axis of the polarizer and a slow axis of the second optical compensation layer is +85° to +95°; and
an Nz coefficient of the second optical compensation layer is 1.2≦Nz≦2.

2. An optical film for VA mode according to claim 1, wherein the second optical compensation layer has a thickness of 1 μm to 10 μm.

3. An optical film for VA mode according to claim 1, wherein the first optical compensation film comprises at least one of a liquid crystal monomer and a liquid crystal polymer.

4. An optical film for VA mode according to claim 1, further comprising an adhesive layer between the first optical compensation layer and the second optical compensation layer.

5. An image display apparatus, comprising the optical film for VA mode according to claim 1.

6. A method of producing an optical the optical film for VA mode of claim 1, comprising the steps of:
subjecting a surface of a transparent protective film (T) to alignment treatment;
forming a first optical compensation layer having a refractive index profile of nx>ny=nz and comprising a λ/2 plate on the surface of the transparent protective film (T) subjected to the alignment treatment;
laminating a polarizer on the surface of the transparent protective film (T); and
forming a second optical compensation layer having a refractive index profile of nx>ny>nz and consisting of a λ/4 plate on a surface of the first optical compensation layer, wherein:
the second optical compensation layer is formed of at least one polymer selected from the group consisting of polyimide, polyamide, polyetherketone, polyamideimide, and polyesterimide;
the polarizer and the first optical compensation layer are arranged on opposite sides through the transparent protective film (T);
the first optical compensation layer is formed so that an angle formed between a slow axis of the first optical compensation layer and an absorption axis of the polarizer is +17° to +27° or −17° to −27°; and
the second optical compensation layer is formed so that an angle formed between a slow axis of the second optical compensation layer and the absorption axis of the polarizer is +85° to +95°;
wherein the second optical compensation layer is formed so that an Nz coefficient is 1.2≦Nz≦2.

7. A method of producing an optical film according to claim 6, wherein the step of forming the first optical compensation layer comprises the steps of:
applying an application liquid containing a liquid crystal material; and
aligning the applied liquid crystal material through treatment at a temperature at which the liquid crystal material exhibits a liquid crystal phase.

8. A method of producing an optical film according to claim 7, wherein:
the liquid crystal material comprises a polymerizable monomer and/or a crosslinking monomer; and
the step of aligning the liquid crystal material further comprises conducting polymerization treatment and/or crosslinking treatment.

9. A method of producing an optical film according to claim 8, wherein the polymerization treatment and/or the crosslinking treatment is conducted through heating or photoirradiation.

10. A method of producing an optical film according to claim 6, wherein the step of forming the second optical compensation layer on a surface of the first optical compensation layer comprises the steps of:

applying on a surface of a substrate sheet an application liquid containing at least one polymer selected from the group consisting of polyimide, polyamide, polyetherketone, polyamideimide, and polyesterimide;

forming a polymer layer on the surface of the substrate sheet by drying the application liquid;

forming the second optical compensation layer on the substrate sheet by heating and stretching the polymer layer together with the substrate sheet;

attaching the second optical compensation layer formed on the substrate sheet to the surface of the first optical compensation layer; and peeling off the substrate sheet from the second optical compensation layer.

11. A method of producing an optical film according to claim 10, wherein the polymer layer is stretched together with the substrate sheet at a stretch ratio of 1.2 times to 3 times in the step of forming the second optical compensation layer on the substrate sheet.

12. A method of producing an optical film according to claim 10, wherein the polymer layer is stretched together with the substrate sheet in a width direction in the step of forming the second optical compensation layer on the substrate sheet.

* * * * *